(12) United States Patent
Shikata

(10) Patent No.: US 11,248,068 B2
(45) Date of Patent: Feb. 15, 2022

(54) POLYETHYLENE COMPOSITION

(71) Applicant: Asahi Kasei Kabushiki Kaisha, Tokyo (JP)

(72) Inventor: Kazuya Shikata, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/633,346

(22) PCT Filed: Jul. 24, 2018

(86) PCT No.: PCT/JP2018/027643
§ 371 (c)(1),
(2) Date: Jan. 23, 2020

(87) PCT Pub. No.: WO2019/022058
PCT Pub. Date: Jan. 31, 2019

(65) Prior Publication Data
US 2020/0165361 A1 May 28, 2020

(30) Foreign Application Priority Data

Jul. 28, 2017 (JP) .............................. JP2017-146829

(51) Int. Cl.
*C08F 10/02* (2006.01)
*C08J 3/12* (2006.01)
*C08L 23/06* (2006.01)

(52) U.S. Cl.
CPC .............. *C08F 10/02* (2013.01); *C08J 3/12* (2013.01)

(58) Field of Classification Search
None
See application file for complete search history.

(56) References Cited

U.S. PATENT DOCUMENTS 9,115,233 B2 * 8/2015 Ker .................. B32B 27/06
2003/0139546 A1 7/2003 Jain et al.
(Continued)

FOREIGN PATENT DOCUMENTS

JP 2003-517487 A 5/2003
JP 2010-235926 A 10/2010
(Continued)

OTHER PUBLICATIONS

International Preliminary Report on Patentability and Written Opinion issued in corresponding International Patent Application No. PCT/JP2018/027643 dated Feb. 6, 2020.
(Continued)

*Primary Examiner* — Fred M Teskin
(74) *Attorney, Agent, or Firm* — Morgan, Lewis & Bockius LLP

(57) ABSTRACT

A polyethylene composition containing:
the following features (A) and (B):
(A) a cumulative percentage elution from 50° C. to 98° C. is 50% by mass or more and less than 80% by mass in an elution temperature-cumulative eluate volume curve obtained by measuring eluate volumes every 1° C. by temperature rising elution fractionation (TREF) of cross-fractionation chromatography (CFC); and
(B) the polyethylene composition comprises at least one eluted component having a weight-average molecular weight ($M_w$) of 200,000 or more at a temperature of 85° C. or more and less than 105° C. among eluted components recovered every 1° C. by temperature rising elution fractionation (TREF) of cross-fractionation chromatography (CFC).

9 Claims, 1 Drawing Sheet

(56) References Cited

U.S. PATENT DOCUMENTS

2015/0065595 A1     3/2015   Nasu et al.
2017/0321046 A1    11/2017   Vantomme et al.

FOREIGN PATENT DOCUMENTS

| JP | 2014-118515 A | 6/2014 |
| JP | 2014-118535 A | 6/2014 |
| JP | 2015-101680 A | 6/2015 |
| JP | 2015-134900 A | 7/2015 |
| WO | 2016/075164 A1 | 5/2016 |

OTHER PUBLICATIONS

European Search Report issued in counterpart European Patent Application No. 18837195.9 dated Aug. 27, 2020.
International Search Report issued in corresponding International Patent Application No. PCT/JP2018/027643 dated Oct. 30, 2018.

\* cited by examiner

[Figure1]
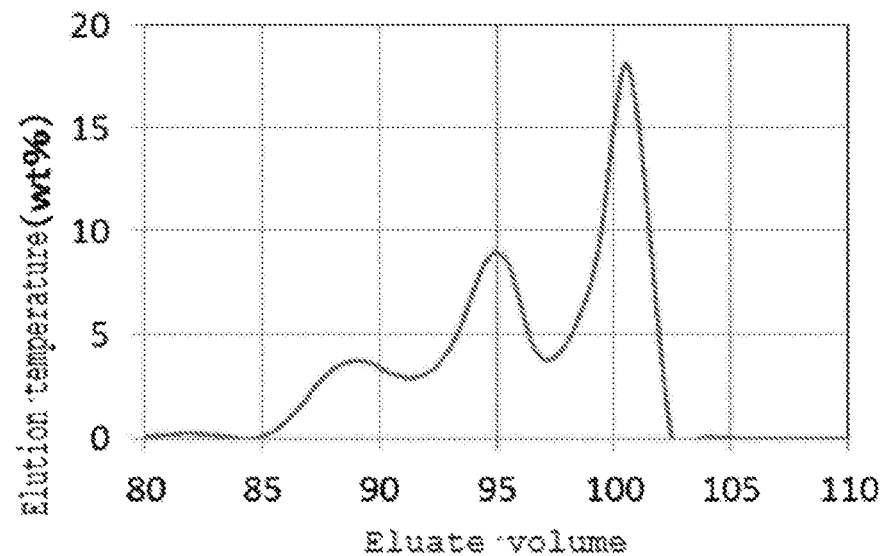
[Figure2]
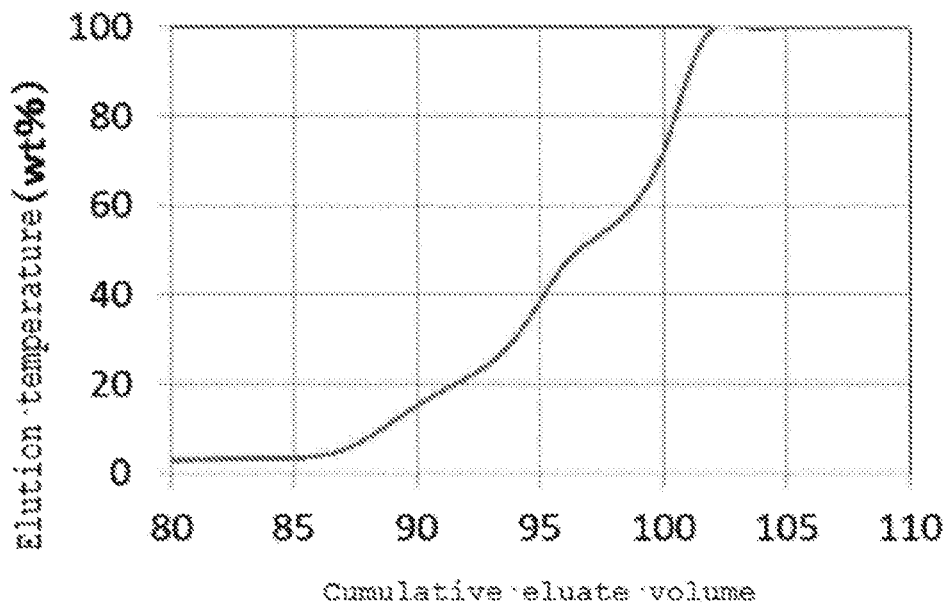

POLYETHYLENE COMPOSITION

TECHNICAL FIELD

The present invention relates to a polyethylene composition.

BACKGROUND ART

Polyethylene is used for various purposes such as sheets, films, and molded articles, and a starting material for battery separators is also one of the important purposes. The separators are porous membranes that are used for the main purpose of separating between a positive electrode and a negative electrode inside of a battery and allowing only ions to penetrate the separators. Examples of other purposes include the purpose of securing strength for securing the strength of a battery, and the purpose of carrying out a shutdown (hereinafter, also referred to as "fuse") function for preventing the risk of runaway battery reaction at a high internal temperature of the battery. Furthermore, it is desirable to improve these characteristics at the same time.

Polyethylene serving as a starting material for separators has been commercialized in a powder form of polyethylene usually having a relatively high molecular weight and having a high density as compared with general-purpose polyethylene for use in sheets, films, molded articles, and the like. The reason why the polyethylene serving as a starting material for separators has a high molecular weight and has a high density is the securing of the strength of the separators. The reason why the polyethylene serving as a starting material for separators is in a powder form is difficult pelletization due to poor processability ascribable to the high molecular weight and furthermore, better processability of the powder form.

In order to obtain excellent separators, a great deal of research and development has previously been made. One of the challenges is the control of heat shrinkage in the course of film formation. A general process of producing microporous membranes or the like involves a drawing step. In order to suppress post-drawing heat shrinkage and heat shrinkage in a use environment, an annealing (hereinafter, also referred to as "heat setting") step for relaxing molecular orientation is usually carried out after the drawing step. In the heat setting step, the molecular orientation is relaxed by the molecular motion of a component that easily makes a molecular motion even at a low temperature (hereinafter, also referred to as an "amorphous component"). However, high-density polyethylene having a high degree of crystallinity undergoes insufficient relaxation of molecular orientation due to a small percentage of the amorphous component. A problem thereof is unstable thicknesses, etc. of microporous membranes ascribable to heat shrinkage or the like.

A method for efficiently carrying out an annealing step, wherein moderate molecular mobility can be secured in a low-temperature state by appropriately adjusting the average molecular weight and molecular weight distribution of polyethylene (see, for example, Patent Literature 1) has been known as an approach of solving this challenge.

A tradeoff relationship in which the processability of polyethylene is deteriorated as its average molecular weight is increased in order to enhance the strength of separators is also one of the main challenges. In order to solve this challenge, a method for providing a molded article excellent in mechanical strength while securing excellent solubility or melting properties by appropriately adjusting the average molecular weight and molecular weight distribution of polyethylene (see, for example, Patent Literature 2) has been known. In order to solve a similar challenge, a method for controlling the processing conditions (the amount of a solvent used, a kneading temperature, a kneading torque, etc.) of a polyethylene powder (see, for example, Patent Literature 3) has been also known.

CITATION LIST

Patent Literature

Patent Literature 1: Japanese Patent Laid-Open No. 2014-118515

Patent Literature 2: Japanese Patent Laid-Open No. 2014-118535

Patent Literature 3: Japanese Patent Laid-Open No. 2010-235926

SUMMARY OF INVENTION

Technical Problem

The inventions of Patent Literatures 1 to 3 have been made with emphasis placed on the viewpoint of securing the strength of membranes or controlling heat shrinkage, but have not discussed further achievement of a fuse function. Furthermore, the inventions of Patent Literatures 1 to 3 have an insufficient fuse function at a low temperature due to use of polyethylene having a high degree of crystallinity. A further problem of the inventions of Patent Literatures 1 to 3 is very poor fluidity of polyethylene due to the high molecular weight which requires a long time from the start to the completion of a fuse.

Accordingly, an object of the present invention is to provide a polyethylene composition that can impart excellent strength and fuse performance to a processed separator and is excellent in slit processability.

Solution to Problem

The present inventor has conducted diligent studies to attain the object and consequently has completed the present invention by finding that the object can be attained when a difference between a resin temperature that provides the largest torque peak and a resin temperature that provides the second largest peak observed from a polyethylene composition heated and kneaded together with a solvent is equal to or less than a predetermined difference in temperature, i.e., the course of swelling and melting of polyethylene at the time of kneading is completed within the predetermined difference in temperature; when the amount of an eluted component at 98° C. falls within a specific range in an elution temperature-cumulative eluate volume curve obtained by temperature rising elution fractionation (TREF) of cross-fractionation chromatography (CFC); and when the polyethylene composition has at least one eluted component having a weight-average molecular weight ($M_w$) of 200,000 or more within a specific temperature range in an elution temperature-eluate volume curve obtained by temperature rising elution fractionation (TREF) of cross-fractionation chromatography (CFC).

Specifically, the present invention relates to the following:

[1]
A polyethylene composition comprising:
the following features (A) and (B):
(A) a cumulative percentage elution from 50° C. to 98° C. is 50% by mass or more and less than 80% by mass in an elution temperature-cumulative eluate volume curve obtained by measuring eluate volumes every 1° C. by temperature rising elution fractionation (TREF) of cross-fractionation chromatography (CFC); and
(B) the polyethylene composition comprises at least one eluted component having a weight-average molecular weight ($M_w$) of 200,000 or more at a temperature of 85° C. or more and less than 105° C. among eluted components recovered every 1° C. by temperature rising elution fractionation (TREF) of cross-fractionation chromatography (CFC).

[2]
The polyethylene composition according to [1], wherein an on-sieve component is absent when the polyethylene composition is sifted using a sieve having an aperture size of 300 μm according to JIS Z 8815.

[3]
The polyethylene composition according to [1] or [2], wherein
a chlorine content is 50 ppm by mass or less.

[4]
The polyethylene composition according to any one of [1] to [3], wherein
a content of an additive aimed at imparting fluidity is 5000 ppm by mass or less.

[5]
The polyethylene composition according to any one of [1] to [4], wherein
a cumulative percentage elution from 50° C. to 94° C. is less than 40% by mass in the elution temperature-cumulative eluate volume curve obtained by measuring eluate volumes every 1° C. by temperature rising elution fractionation (TREF) of cross-fractionation chromatography (CFC).

[6]
The polyethylene composition according to any one of [1] to [5], wherein
the cumulative percentage elution from 50° C. to 94° C. is 10% by mass or more in the elution temperature-cumulative eluate volume curve obtained by measuring eluate volumes every 1° C. by temperature rising elution fractionation (TREF) of cross-fractionation chromatography (CFC).

[7]
The polyethylene composition according to any of [1] to [6], wherein
the polyethylene composition comprises three or more peaks in an elution temperature-eluate volume curve obtained by measuring eluate volumes every 1° C. by temperature rising elution fractionation (TREF) of cross-fractionation chromatography (CFC).

[8]
The polyethylene composition according to any one of [1] to [7], wherein
the polyethylene composition comprises a polyethylene powder, wherein
when the polyethylene powder is sifted using sieves having an aperture size of 53 μm, 75 μm, 106 μm, 150 μm, 212 μm, and 300 μm according to JIS Z 8815 and classified into each segment,
weight-average molecular weight $M_1$ of a coarsest-powder segment, weight-average molecular weight $M_2$ of a largest-percentage segment, and weight-average molecular weight $M_3$ of a finest-powder segment satisfy a relationship of the following expression 1:

$$0.8 \leq M_1/M_2 \leq 1.2 \text{ and } 0.8 \leq M_3/M_2 \leq 1.2 \qquad \text{Expression 1.}$$

[9]
The polyethylene composition according to any of [1] to [8], wherein
a difference between a resin temperature at which a peak of the largest torque is detected and a resin temperature at which a peak of the second largest torque is detected is 25° C. or less in a torque curve obtained by kneading 24 g of liquid paraffin having an average molecular weight of 450 or more and less than 550 using Labo Plastomill (Toyo Seiki Seisaku-sho, Ltd. product unit model 4C150, mixer model: R-60) under conditions of a set temperature of 114° C. and a rotational speed of 5 rpm for 10 minutes, then adding thereto 16 g of the polyethylene composition and 0.4 g of tetrakis[methylene(3,5-di-t-butyl-4-hydroxy-hydrocinnamate)]methane, and kneading the mixture at a rotational speed of 30 rpm for 3 minutes, followed by kneading under conditions of elevating the set temperature from 114° C. to 163° C. over 6 minutes.

Advantageous Effects of Invention

The present invention can provide a polyethylene composition that can impart excellent strength and fuse performance to a processed separator and has favorable slit processability.

BRIEF DESCRIPTION OF DRAWINGS

FIG. 1 shows an elution temperature-eluate volume curve obtained by cross-fractionation chromatography (CFC) measurement.

FIG. 2 shows an elution temperature-cumulative eluate volume curve obtained by cross-fractionation chromatography (CFC) measurement.

DESCRIPTION OF EMBODIMENTS

Hereinafter, the mode for carrying out the present invention (hereinafter, referred to as the "present embodiment") will be described in detail. The present invention is not limited by the present embodiment given below, and various changes or modifications can be made therein without departing from the spirit of the present invention.

In the present specification, the term "fuse performance" refers to performance by which, for example, a processed separator can cause a shutdown (fuse) even at a low temperature with a sufficient fast fuse rate.

[Polyethylene Composition]

The polyethylene composition of the present embodiment has features (A) and (B) given below. The polyethylene composition of the present embodiment having the features (A) and (B) given below can impart excellent strength and fuse performance to a processed separator. The polyethylene composition of the present embodiment having the features (A) and (B) is also excellent in slit processability in slit processing for adjusting membrane widths because the polyethylene composition can sufficiently prevent waving, fluffing, or the like at the cross-sections of membranes.

(A) A cumulative percentage elution from 50° C. to 98° C. is 50% by mass or more and less than 80% by mass in an elution temperature-cumulative eluate volume curve obtained by measuring eluate volumes every 1° C. by temperature rising elution fractionation (TREF) of cross-fractionation chromatography (CFC).

(B) The polyethylene composition has at least one eluted component having a weight-average molecular weight ($M_w$) of 200,000 or more at a temperature of 85° C. or more and less than 105° C. among eluted components recovered every 1° C. by temperature rising elution fractionation (TREF) of cross-fractionation chromatography (CFC).

The polyethylene composition of the present embodiment is, for example, in a powder form. Hereinafter, the polyethylene composition in a powder form is also referred to as a "polyethylene powder" in the present specification.

The polyethylene composition of the present embodiment comprises an ethylene polymer (hereinafter, also referred to as "polyethylene"). Examples of the ethylene polymer include an ethylene homopolymer and/or a copolymer of ethylene and an additional comonomer copolymerizable with ethylene (e.g., a binary or ternary copolymer). The binding format of the copolymer may be random or block. Examples of the additional comonomer include, but are not particularly limited to, α-olefins and vinyl compounds. These additional comonomers can be used each alone or in combination of two or more thereof. Examples of the α-olefins include, but are not particularly limited to, α-olefins having 3 to 20 carbon atoms and specifically include propylene, 1-butene, 4-methyl-1-pentene, 1-hexene, 1-octene, 1-nonene, 1-decene, 1-undecene, 1-dodecene, 1-tridecene, and 1-tetradecene. Among them, propylene and/or 1-butene are preferred as the additional comonomer from the viewpoint of further improving the heat resistance and strength of molded articles such as membranes and fibers. Examples of the vinyl compounds include, but are not particularly limited to, vinylcyclohexane, styrene and their derivatives. A non-conjugated polyene such as 1,5-hexadiene or 1,7-octadiene may be used, if necessary, as the additional comonomer.

The polyethylene composition of the present embodiment may be used in a mixture form in which ethylene polymers differing in viscosity-average molecular weight, molecular weight distribution, or the like are mixed (blended), or may be used in a mixture form in which the ethylene polymer is mixed (blended) with an additional resin such as low-density polyethylene, linear low-density polyethylene, polypropylene, or polystyrene.

The cumulative percentage elution from 50° C. to 98° C. of the polyethylene composition of the present embodiment is 50% by mass or more and less than 80% by mass, preferably 52% by mass or more and less than 78% by mass, more preferably 54% by mass or more and less than 76% by mass, particularly preferably 56% by mass or more and less than 74% by mass, in the elution temperature-cumulative eluate volume curve of CFC. The cumulative percentage elution that falls within the range described above means that the percentages of low-molecular-weight and high-molecular-weight components of the polyethylene composition of the present embodiment fall within ranges necessary for achieving both the strength and fuse performance of separators.

In this context, the elution temperature-cumulative eluate volume curve of CFC can be determined by the method given below.

A packing material-containing column of a CFC measurement apparatus is heated to 140° C., and 20 ml of a sample solution (sample concentration: 1.0 mg/ml) of polyethylene dissolved in o-dichlorobenzene is introduced thereto and kept for 120 minutes. Next, the temperature of the column is lowered to 40° C. at a cooling rate of 0.5° C./min and then kept for 20 minutes. Then, the temperature of the column is adjusted as follows: the temperature is raised to 50° C., kept at 50° C., subsequently raised to 60° C., and kept at 60° C. The temperature is further raised and kept at 5° C. intervals from 60° C. to 75° C., raised and kept at 3° C. intervals from 75° C. to 90° C., and raised and kept at 1° C. intervals from 90° C. to 120° C. Each course of heating involves heating at a rate of 20° C./min and keeping the resulting retention temperature for 21 minutes. The concentration (% by mass) of a sample (polyethylene) eluted during keeping at each retention temperature for 21 minutes is detected, and an elution temperature-eluate volume curve and an elution temperature-cumulative eluate volume curve are obtained from the retention temperatures and the eluted sample concentrations.

The cumulative percentage elution from 50° C. to 94° C. of the polyethylene composition of the present embodiment is preferably less than 40% by weight, more preferably less than 38% by weight, further preferably less than 34% by weight, in the elution temperature-cumulative eluate volume curve. The cumulative percentage elution up to 94° C. that falls within the range described above is preferred because the amount of a low-molecular-weight component is relatively proper and fuse performance can be improved without reducing strength.

The cumulative percentage elution from 50° C. to 94° C. of the polyethylene composition of the present embodiment is preferably 10% by weight or more, more preferably 12% by weight or more, further preferably 14% by weight or more, in the elution temperature-cumulative eluate volume curve. The cumulative percentage elution up to 94° C. that falls within the range described above is preferred because the amount of a low-molecular-weight component is relatively proper and fuse performance can be improved without reducing strength.

Examples of the method for adjusting the cumulative percentage elution to within the range described above include methods of adjusting an average molecular weight in polymerization for polyethylene, for example, a method of adjusting the amount of a chain transfer agent, and a method of forming a polyethylene mixture of polyethylene having a relatively high molecular weight and polyethylene having a low molecular weight, and adjusting their molecular weights and percentages. The latter method is preferably used for improving fuse performance, slit processability and separator productivity (fine adjustment of the molecular weight of a polyethylene starting material) without reducing the strength of membranes. However, polyethylenes differing largely in molecular weight are generally difficult to mix uniformly, and unsuccessful uniform mixing presents problems such as promotion of defects or variation in membrane physical properties. Examples of the method for solving such problems include a method of intentionally adding a small amount of a low-molecular-weight component to the polymerization system for polyethylene. The problems associated with mixing are solved because high-molecular-weight and low-molecular-weight components are uniformly dispersed at the time of production by polymerizing both the components at the same time. Another effective approach involves producing polyethylene having a relatively high molecular weight and polyethylene having a low molecular weight by the method of intentionally adding a small amount of a low-molecular-weight component, to form a mixture thereof. Examples of the method of intentionally adding a small amount of a low-molecular-weight component include: a method of feeding a catalyst into a polymerization reactor from three locations, wherein the position of feed at one of the locations is adjacent to the feed position of ethylene; a method wherein the catalyst feed positions at the two locations distant from the ethylene feed position are disposed near the surface of the solution in the polymerization reactor, and the catalyst feed position close to the ethylene feed position is disposed near the bottom of the polymerization reactor; a method of establishing no baffle plate in a polymerization reactor; a method of rendering the angle of a stirring blade vertical in a polymerization reactor; and a method of intentionally delaying the inactivation of a catalyst in a flash drum, and maintaining conditions of a high temperature and a low pressure in the meantime.

[Peak in Elution Temperature-Eluate Volume Curve]

The polyethylene composition of the present embodiment has three or more peaks in an elution temperature-eluate volume curve. Polyethylene usually has one or two peaks in the elution temperature-eluate volume curve, whereas polyethylene having three or more peaks is preferred because of its much better fuse function. Polyethylene having a relatively low molecular weight is necessary for exerting a fuse function, and polyethylene having a relatively high molecular weight is necessary for sufficiently securing strength. The polyethylene having three or more peaks has components having a wide range of molecular weights at the same time and can probably achieve both of these performances. Examples of the method for having three or more peaks include a method of forming a polyethylene mixture of polyethylene having a relatively high molecular weight and polyethylene having a low molecular weight, and adjusting their molecular weights and percentages.

[Weight-Average Molecular Weight]

The polyethylene composition of the present embodiment has at least one eluted component having a weight-average molecular weight ($M_w$) of 200,000 or more, preferably 220,000 or more, more preferably 250,000 or more, at a temperature of 85° C. or more and less than 105° C. among eluted components recovered every 1° C. by temperature rising elution fractionation (TREF) of cross-fractionation chromatography (CFC). Such a component having a relatively high molecular weight tends to be able to sufficiently secure the strength of separators and is therefore preferred. The $M_w$ of the polyethylene can be adjusted by the presence of hydrogen in the polymerization system or by the change of the polymerization temperature.

[Chlorine Content]

The chlorine content (hereinafter, also referred to as a "total chlorine level") of the polyethylene composition of the present embodiment is preferably 50 ppm by mass or less, more preferably 20 ppm by mass or less, further preferably 5 ppm by mass or less. The polyethylene composition having the total chlorine level of 50 ppm by mass or less is excellent in thermal stability and furthermore, produces better long-term stability of separators. The total chlorine level of 5 ppm by mass or less is preferred because a chlorine-containing component reacts with an antioxidant and a thermal stabilizer added for processing to form a quinone compound, which can sufficiently prevent battery separators from being colored yellowish. The total chlorine level of the polyethylene composition of the present embodiment can be controlled by polyethylene productivity per unit catalyst. The polyethylene productivity can be controlled by the polymerization temperature or polymerization pressure of a reactor for production, or a slurry concentration. Specific examples of the method for enhancing the productivity of the polyethylene used in the present embodiment include a method of elevating a polymerization temperature, a method of elevating a polymerization pressure, a method of elevating a slurry concentration, and combinations thereof. Another possible method may involve further reducing the total chlorine level using an inert gas containing water or the like in a deactivation step after polymerization.

[Amount of Additive]

The content of an additive aimed at imparting fluidity (hereinafter, also simply referred to as an "additive") in the polyethylene composition of the present embodiment is preferably 5000 ppm by mass or less, more preferably 4000 ppm by mass or less, further preferably 3000 ppm by mass or less. The additive aimed at imparting fluidity is also called a lubricant. Specific examples of such a substance include, but are not particularly limited to, calcium stearate, magnesium stearate, and zinc stearate. The addition of the lubricant enhances the fluidity of the polyethylene composition and improves productivity or is also suitable for applicability to processing, such as drawability. However, for the purposes of separators, a lubricant that has bled out to membrane surface at the time of film formation disadvantageously adheres to rolls or the like or remains thereon. Therefore, preferred production can be achieved by using the lubricant at 5000 ppm or less. Accordingly, the content of the additive is preferably 50 ppm by mass or more and 5000 ppm by mass or less, more preferably 100 ppm by mass or more and 4000 ppm by mass or less, further preferably 150 ppm by mass or more and 3000 ppm by mass or less, from the viewpoint of maintaining productivity and applicability to processing while sufficiently suppressing bleedout.

[Sifting]

The polyethylene composition of the present embodiment is preferably in a powder form, i.e., preferably contains a polyethylene powder.

When the polyethylene composition of the present embodiment is sifted using a sieve having an aperture size of 300 μm according to JIS Z 8815, the percentage of an on-sieve component (component remaining on the sieve) is preferably 0.5% by mass or less, more preferably 0.2% by mass or less, further preferably 0.0% by mass, i.e., absent, with respect to the whole polyethylene composition. The percentage of the on-sieve component equal to or less than 0.5% by mass tends to be able to sufficiently prevent defects of membrane surface of separators. In the polyethylene composition of the present embodiment containing a polyethylene powder, when the polyethylene powder is sifted using sieves having an aperture size of 53 μm, 75 μm, 106 μm, 150 μm, 212 μm, and 300 μm according to JIS Z 8815 and classified into each segment, weight-average molecular weight $M_1$ of a coarsest-powder segment, weight-average molecular weight $M_2$ of a largest-percentage segment, and weight-average molecular weight $M_3$ of a finest-powder segment preferably satisfy a relationship of the expression 1 given below. The polyethylene composition of the present embodiment may contain two or more types of polyethylene powders differing in weight-average molecular weight. In this case, each of the polyethylene powders preferably satisfies the expression 1 given below. In the expression 1, $M_1/M_2$ is more preferably 0.85 or more and 1.15 or less, further preferably 0.9 or more and 1.1 or less, and $M_3/M_2$ is more preferably 0.85 or more and 1.15 or less, further preferably 0.9 or more and 1.1 or less.

$$0.8 \leq M_1/M_2 \leq 1.2 \text{ and } 0.8 \leq M_3/M_2 \leq 1.2 \qquad \text{Expression 1.}$$

The satisfaction of the expression 1 means less variation in the molecular weight of the polyethylene powder depending on particle sizes. Whether to be a high molecular weight on the fine powder side or on the coarse powder side at the time of polymerization varies depending on catalytic species. In addition, this might be influenced by scales or unexpected polymerization. For example, coarse powders might mix in the polyethylene powder as a result of peeling and crushing scales in a reactor. On the other hand, fine powders easily fly in a reactor and as a result, might have finished polymerization for a residence time different from that of usual polyethylene. For these reasons, the fine powders and the coarse powders may have a molecular weight different from that of typical polyethylene and thereby incur powders that remain undissolved during polymerization, or poor kneading and dispersion. Examples of the method for uniformly controlling the polymerization-average molecular weights of fine powders and coarse powders include the selection of a polymerization catalyst, the removal of scales by washing in the inside of a polymerization reactor or piping, and the suppression of stirring of a polymerization reactor. Another effective approach involves removing coarse powders and fine powders from the obtained polyethylene powder.

In this context, the weight-average molecular weight of each segment employs weight-average molecular weight $M_w$ measured using GPC. A viscosity-average molecular weight measured using a viscometer is used for polyethylene in a high-molecular-weight region that cannot be measured by GPC. However, $M_1$, $M_2$, and $M_3$ of the same polyethylene are measured by the same measurement method. The measurement in any of the methods is attained using a small amount of a sample. If the amount of an on-sieve sample of the coarsest powder is insufficient for measurement, a powder sample finer by one stage is used in the measurement. The same holds true for the fine powder side.

[Torque]

In the polyethylene composition of the present embodiment, a difference between a resin temperature at which a peak of the largest torque is detected and a resin temperature at which a peak of the second largest torque is detected is, for example, 25° C. or less (e.g., 10° C. or more and 25° C. or less), preferably 23° C. or less, more preferably 21° C. or less, in a torque curve obtained by kneading 24 g of liquid paraffin having an average molecular weight of 450 or more and less than 550 using Labo Plastomill (Toyo Seiki Seisaku-sho, Ltd. product unit model 4C150, mixer model: R-60) under conditions of a set temperature of 114° C. and a rotational speed of 5 rpm for 10 minutes, then adding thereto 16 g of the polyethylene composition and 0.4 g of tetrakis[methylene(3,5-di-t-butyl-4-hydroxy-hydrocinnamate)]methane, and kneading the mixture at a rotational speed of 30 rpm for 3 minutes, followed by kneading under conditions of elevating the set temperature from 114° C. to 163° C. over 6 minutes. In this test, the torque forms a peak of the largest torque when the polyethylene composition is swollen in a solvent, and forms a peak of the second largest torque when the resin is melted. Therefore, this small difference in temperature means soluble polyethylene that shifts rapidly from swelling to melting, which is preferred because the polyethylene is more uniformly kneaded in an extruder. Examples of the method for decreasing the difference in temperature include an approach of decreasing the average molecular weight of polyethylene, an approach of decreasing the degree of crystallinity of polyethylene, and an approach of decreasing the bulk density of polyethylene. The approaches of decreasing the average molecular weight or the degree of crystallinity tend to incur reduction in the strength of separators and are therefore not preferred. When the polyethylene composition is in a powder form, the approach of decreasing the bulk density thereof is effective as the method for decreasing the difference in temperature between the torque peaks. Specifically, an approach of controlling the bulk density by removing a carrier from a polymerization catalyst by dissolution after polymerization for the polyethylene is preferred.

[Catalytic Component]

The catalytic component for use in the production of the ethylene polymer constituting the polyethylene powder of the present embodiment is not particularly limited, and the ethylene polymer of the present embodiment can be produced using a Ziegler-Natta catalyst, a metallocene catalyst, or the like.

First, the Ziegler-Natta catalyst will be described. The Ziegler-Natta catalyst is preferably a catalyst for olefin polymerization comprising a solid catalytic component [A] and an organic metal compound component [B], wherein the solid catalytic component [A] is produced by reacting an organic magnesium compound (A-1) represented by the following formula 2 which is soluble in an inert hydrocarbon solvent with a titanium compound (A-2) represented by the following formula 3:

$$(A\text{-}1)\text{:}(M^1)_\alpha(Mg)_\beta(R^2)_a(R^3)_bY^1_c \qquad \text{Formula 2}$$

wherein $M^1$ represents a metal atom belonging to any of groups 12, 13, and 14 of the periodic system; $R^2$ and $R^3$ each represent a hydrocarbon group having 2 or more and 20 or less carbon atoms; $Y^1$ represents any of an alkoxy group, a siloxy group, an allyloxy group, an amino group, an amide group, $-N=C-R^4$, $R^5$, $-SR^6$ (wherein $R^4$, $R^5$, and $R^6$ each independently represent a hydrocarbon group having 1 or more and 20 or less carbon atoms), and a β-keto acid residue, and a plurality of $Y^1$ moieties may be different from each other; and α, β, a, b, and c each represent a real number that satisfies the following relationships: $0 \leq \alpha$, $0 < \beta$, $0 \leq a$, $0 \leq b$, $0 \leq c$, $0 < a+b$, $0 \leq b/(\alpha+\beta) \leq 2$, and $n\alpha+2\beta=a+b+c$ (wherein n represents the valence of $M^1$); and

$$(A\text{-}2)\text{:}Ti(OR^7)_dX^1_{(4-d)} \qquad \text{Formula 3}$$

wherein d represents a real number of 0 or more and 4 or less; $R^7$ represents a hydrocarbon group having 1 or more and 20 or less carbon atoms; and $X^1$ represents a halogen atom.

Specific examples of the inert hydrocarbon solvent for use in the reaction between the compounds (A-1) and (A-2) include, but are not particularly limited to: aliphatic hydrocarbons such as butane, pentane, hexane, and heptane; aromatic hydrocarbons such as benzene, toluene, and xylene; and alicyclic hydrocarbons such as cyclopentane, cyclohexane, methylcyclohexane, and decalin.

First, the compound (A-1) will be described. The compound (A-1) is represented in the form of an organic magnesium complex compound soluble in an inert hydrocarbon solvent, and encompasses all of dihydrocarbyl magnesium compounds and their complexes with other metal compounds. The relational expression $n\alpha+2\beta=a+b+c$ of the symbols α, β, a, b, and c represents the stoichiometry of metal atom valence and substituents.

In the formula 2, specific examples of the hydrocarbon group having 2 or more and 20 or less carbon atoms, represented by $R^2$ or $R^3$ include, but are not particularly limited to, alkyl groups, cycloalkyl groups, and aryl groups, for example, an ethyl group, a propyl group, a butyl group, a propyl group, a hexyl group, an octyl group, a decyl group, a cyclohexyl group, and a phenyl group. Among them, alkyl groups are preferred. When α>0, a metal atom belonging to any of groups 12, 13, and 14 of the periodic system can be used as the metal atom $M^1$. Examples thereof include zinc, boron, and aluminum. Among them, aluminum and/or zinc are preferred.

The ratio $\beta/\alpha$ of magnesium to the metal atom $M^1$ is not particularly limited and is preferably 0.1 or more and 30 or less, more preferably 0.5 or more and 10 or less. In the case of using a predetermined organic magnesium compound wherein $\alpha=0$, for example, a compound wherein $R^2$ is 1-methylpropyl or the like is soluble in an inert hydrocarbon solvent. Such a compound also brings about a preferred consequence to the present embodiment. It is preferred that $R^2$ and $R^3$ should satisfy any one of the following three conditions (1), (2), and (3) in the formula 2 wherein $\alpha=0$.

Condition (1): at least one of $R^2$ and $R^3$ is preferably a secondary or tertiary alkyl group having 4 or more and 6 or less carbon atoms, more preferably both of $R^2$ and $R^3$ are alkyl groups having 4 or more and 6 or less carbon atoms and at least one of the groups is a secondary or tertiary alkyl group.

Condition (2): $R^2$ and $R^3$ are preferably alkyl groups differing in the number of carbon atoms, more preferably $R^2$ is an alkyl group having 2 or 3 carbon atoms and $R^3$ is an alkyl group having 4 or more carbon atoms.

Condition (3): at least one of $R^2$ and $R^3$ is preferably a hydrocarbon group having 6 or more carbon atoms, more preferably an alkyl group wherein the total number of carbon atoms contained in $R^2$ and $R^3$ is 12 or more.

Hereinafter, these groups will be shown specifically. In the condition (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is preferred.

In the condition (2), specific examples of the alkyl group having 2 or 3 carbon atoms include, but are not particularly limited to, ethyl, 1-methylethyl, and propyl groups. Among them, an ethyl group is preferred. Specific examples of the alkyl group having 4 or more carbon atoms include, but are not particularly limited to, a butyl group, a pentyl group, a hexyl group, a heptyl group, and an octyl group. Among them, butyl and/or hexyl groups are preferred.

In the condition (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and/or octyl groups are more preferred.

In general, a catalytic component with an alkyl group containing a larger number of carbon atoms tends to be more soluble in an inert hydrocarbon solvent and tends to form a solution having a higher viscosity. A moderate long chain alkyl group is therefore preferably used in terms of handling. The organic magnesium compound can be diluted, for use, with an inert hydrocarbon solvent. This solution can be used without any problem even if trace amounts of Lewis basic compounds such as ethers, esters, and amines are contained or remain therein.

Next, $Y^1$ will be described. In the formula 2, $Y^1$ is any of an alkoxy group, a siloxy group, an allyloxy group, an amino group, an amide group, —N=C—$R^4$, $R^5$, —$SR^6$ (wherein $R^4$, $R^5$, and $R^6$ each independently represent a hydrocarbon group having 2 or more and 20 or less carbon atoms), and a β-keto acid residue.

In the formula 2, the hydrocarbon group represented by $R^4$, $R^5$, or $R^6$ is preferably an alkyl group or an aryl group having 1 or more and 12 or less carbon atoms, more preferably an alkyl group or an aryl group having 3 or more and 10 or less carbon atoms. Specific examples thereof include, but are not particularly limited to, a methyl group, an ethyl group, a propyl group, a 1-methylethyl group, a butyl group, a 1-methylpropyl group, a 1,1-dimethylethyl group, a pentyl group, a hexyl group, a 2-methylpentyl group, a 2-ethylbutyl group, a 2-ethylpentyl group, a 2-ethylhexyl group, a 2-ethyl-4-methylpentyl group, a 2-propylheptyl group, a 2-ethyl-5-methyloctyl group, an octyl group, a nonyl group, a decyl group, a phenyl group, and a naphthyl group. Among them, any of a butyl group, a 1-methylpropyl group, a 2-methylpentyl and a 2-ethylhexyl group are preferred.

In the formula 2, $Y^1$ is preferably an alkoxy group or a siloxy group. The alkoxy group is not particularly and, specifically, is preferably any of a methoxy group, an ethoxy group, a propoxy group, a 1-methylethoxy group, a butoxy group, a 1-methylpropoxy group, a 1,1-dimethylethoxy group, a pentoxy group, a hexoxy group, a 2-methylpentoxy group, a 2-ethylbutoxy group, a 2-ethylpentoxy group, a 2-ethylhexoxy group, a 2-ethyl-4-methylpentoxy group, a 2-propylheptoxy group, a 2-ethyl-5-methyloctoxy group, an octoxy group, a phenoxy group, and a naphthoxy group. Among them, any of a butoxy group, a 1-methylpropoxy group, a 2-methylpentoxy group, and a 2-ethylhexoxy group are more preferred. The siloxy group is not particularly limited and, specifically, is preferably any of a hydrodimethylsiloxy group, an ethylhydromethylsiloxy group, a diethylhydrosiloxy group, a trimethylsiloxy group, an ethyldimethylsiloxy group, a diethylmethylsiloxy group, and a triethylsiloxy group. Among them, any of a hydrodimethylsiloxy group, an ethylhydromethylsiloxy group, a diethylhydrosiloxy group, and a trimethylsiloxy groups are more preferred.

In the present embodiment, a method for synthesizing the compound (A-1) is not particularly limited, and the compound (A-1) can be synthesized by reacting an organic magnesium compound represented by any of the formulas $R^2MgX^1$ and $R^2Mg$ (wherein $R^2$ is as defined above, and $X^1$ represents halogen) with an organic metal compound represented by any of the formulas $M^1R^3{}_n$ and $M^1R^3{}_{(n-1)}H$ (wherein $M^1$ and $R^3$ are as defined above, and n represents the valence of $M^1$) at 25° C. or more and 150° C. or less in an inert hydrocarbon solvent and, if necessary, subsequently with a compound represented by the formula $Y^1$—H (wherein $Y^1$ is as defined above) or with an organic magnesium compound and/or an organic aluminum compound having a functional group represented by $Y^1$. In the approach of reacting the organic magnesium compound soluble in an inert hydrocarbon solvent with a compound represented by the formula $Y^1$—H, the order in which the compounds are reacted is not particularly limited. Any of the following methods can be used: a method of adding the compound represented by the formula $Y^1$—H into the organic magnesium compound; a method of adding the organic magnesium compound into the compound represented by the formula $Y^1$—H; and a method of adding both of the compounds at the same time.

In the present embodiment, the range of the molar composition ratio $c/(\alpha+\beta)$ of $Y^1$ to all metal atoms in the compound (A-1) is $0 \leq c/(\alpha+\beta) \leq 2$, preferably $0 \leq c/(\alpha+\beta) < 1$. The compound (A-1) wherein the molar composition ratio of $Y^1$ to all metal atoms is 2 or less tends to have better reactivity with the compound (A-2).

Next, the compound (A-2) will be described. The compound (A-2) is a titanium compound represented by the formula 3:

$$(A-2): Ti(OR^7)_d X^1_{(4-d)} \quad \text{Formula 3}$$

wherein d represents a real number of 0 or more and 4 or less; $R^7$ represents a hydrocarbon group having 1 or more and 20 or less carbon atoms; and $X^1$ represents a halogen atom.

In the formula 3, d is preferably 0 or more and 1 or less, more preferably 0. In the formula 3, specific examples of the hydrocarbon group represented by $R^7$ include, but are not particularly limited to: aliphatic hydrocarbon groups such as a methyl group, an ethyl group, a propyl group, a butyl group, a pentyl group, a hexyl group, a 2-ethylhexyl group, a heptyl group, an octyl group, a decyl group, and an allyl group; alicyclic hydrocarbon groups such as a cyclohexyl group, a 2-methylcyclohexyl group, and a cyclopentyl group; and aromatic hydrocarbon groups such as a phenyl group and a naphthyl group. Among them, aliphatic hydrocarbon groups are preferred. Examples of the halogen represented by X' include chlorine, bromine, and iodine. Among them, chlorine is preferred. In the present embodiment, the compound (A-2) is more preferably titanium tetrachloride. In the present embodiment, one compound selected from these compounds may be used alone, or two or more compounds selected therefrom may be used in combination.

Next, the reaction between the compounds (A-1) and (A-2) will be described. The reaction is preferably carried out in an inert hydrocarbon solvent and more preferably carried out in an aliphatic hydrocarbon solvent such as hexane or heptane. In the reaction, the molar ratio between the compounds (A-1) and (A-2) is not particularly limited, and the molar ratio (Ti/Mg) of Ti atom contained in the compound (A-2) to Mg atom contained in the compound (A-1) is preferably 0.1 or more and 10 or less, more preferably 0.3 or more and 3 or less. The reaction temperature is not particularly limited and is preferably in the range of −80° C. or more and 150° C. or less, more preferably in the range of −40° C. to 100° C. The order in which the compounds (A-1) and (A-2) are added is not particularly limited. Any of the following methods can be used: a method of adding the compound (A-2) subsequently to the compound (A-1); a method of adding the compound (A-1) subsequently to the compound (A-2); and a method of adding the compounds (A-1) and (A-2) at the same time. The method of adding the compounds (A-1) and (A-2) at the same time is preferred. In the present embodiment, the solid catalytic component [A] obtained by the reaction is used as a slurry solution with an inert hydrocarbon solvent.

Another example of the Ziegler-Natta catalytic component used in the present embodiment is preferably a catalyst for olefin polymerization comprising a solid catalytic component [C] and an organic metal compound component [B], wherein the solid catalytic component [C] is produced by reacting an organic magnesium compound (C-1) represented by the formula 4 which is soluble in an inert hydrocarbon solvent with a chlorinating agent (C-2) represented by the formula 5, and allowing an organic magnesium compound (C-4) represented by the formula 6 which is soluble in an inert hydrocarbon solvent and a titanium compound (C-5) represented by the formula 7 to be supported by a carrier (C-3) thus prepared:

$$(C-1): (M^2)_\gamma (Mg)_\delta (R^8)_e (R^9)_f (OR^{10})_g \quad \text{Formula 4}$$

wherein $M^2$ represents a metal atom belonging to any of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: 0≤γ, 0<δ, 0≤e, 0≤f, 0≤g, 0<e+f, 0≤g/(γ+δ)≤2, and kγ+2δ=e+f+g (wherein k represents the valence of $M^2$);

$$(C-2): H_h SiCl_i R^{11}_{(4-(h+i))} \quad \text{Formula 5}$$

wherein $R^{11}$ represents a hydrocarbon group having 1 or more and 12 or less carbon atoms; and h and i each represent a real number that satisfies the following relationships: 0<h, 0<i, and 0<h+i≤4;

$$(C-4): (M^1)_\alpha (Mg)_\beta (R^2)_a (R^3)_b Y^1_c \quad \text{Formula 6}$$

wherein $M^1$ represents a metal atom belonging to any of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms), and a β-keto acid residue, and a plurality of $Y^1$ moieties may be different from each other; and α, β, a, b, and c each represent a real number that satisfies the following relationships: 0≤α, 0<β, 0≤a, 0≤b, 0≤c, 0<a+b, 0≤b/(α+β)≤2, and nα+2β=a+b+c (wherein n represents the valence of $M^1$); and $$(C-5): Ti(OR^7)_d X^1_{(4-d)} \quad \text{Formula 7}$$

wherein d represents a real number of 0 or more and 4 or less; $R^7$ represents a hydrocarbon group having 1 or more and 20 or less carbon atoms; and X' represents a halogen atom.

First, the compound (C-1) will be described. The compound (C-1) is represented in the form of an organic magnesium complex compound soluble in an inert hydrocarbon solvent, but encompasses all of dihydrocarbyl magnesium compounds and their complexes with other metal compounds. In the formula 4, the relational expression kγ+2δ=e+f+g of the symbols γ, δ, e, f, and g represents the stoichiometry of metal atom valence and substituents.

In the formula, specific examples of the hydrocarbon group represented by $R^8$ or $R^9$ include, but are not particularly limited to, alkyl groups, cycloalkyl groups, and aryl groups, for example, a methyl group, an ethyl group, a propyl group, a butyl group, a propyl group, a hexyl group, an octyl group, a decyl group, a cyclohexyl group, and a phenyl group. Among them, alkyl groups are preferred for each of $R^8$ and $R^9$. When γ>0, a metal atom belonging to any of groups 12, 13, and 14 of the periodic system can be used as the metal atom $M^2$. Examples thereof include zinc, boron, and aluminum. Among them, aluminum and zinc are preferred.

The ratio δ/γ of magnesium to the metal atom $M^2$ is not particularly limited and is preferably 0.1 or more and 30 or less, more preferably 0.5 or more and 10 or less. In the case of using a predetermined organic magnesium compound wherein γ=0, for example, a compound wherein $R^8$ is 1-methylpropyl or the like is soluble in an inert hydrocarbon solvent. Such a compound also brings about a preferred consequence to the present embodiment. It is preferred that $R^8$ and $R^9$ should satisfy any one of the following three conditions (1), (2), and (3) in the formula 4 wherein γ=0.

Condition (1): at least one of $R^8$ and $R^9$ is preferably a secondary or tertiary alkyl group having 4 or more and 6 or less carbon atoms, more preferably both of $R^8$ and $R^9$ are alkyl groups having 4 or more and 6 or less carbon atoms and at least one of the groups is a secondary or tertiary alkyl group.

Condition (2): $R^8$ and $R^9$ are preferably alkyl groups differing in the number of carbon atoms, more preferably $R^8$ is an alkyl group having 2 or 3 carbon atoms and $R^9$ is an alkyl group having 4 or more carbon atoms.

Condition (3): at least one of $R^8$ and $R^9$ is preferably a hydrocarbon group having 6 or more carbon atoms, more preferably an alkyl group wherein the total number of carbon atoms contained in $R^8$ and $R^9$ is 12 or more.

Hereinafter, these groups shown in these conditions (1) to (3) will be shown specifically. In the condition (1), specific examples of the secondary or tertiary alkyl group having 4 or more and 6 or less carbon atoms include a 1-methylpropyl group, a 2-methylpropyl group, a 1,1-dimethylethyl group, a 2-methylbutyl group, a 2-ethylpropyl group, a 2,2-dimethylpropyl group, a 2-methylpentyl group, a 2-ethylbutyl group, a 2,2-dimethylbutyl group, and a 2-methyl-2-ethylpropyl group. Among them, a 1-methylpropyl group is preferred.

In the condition (2), examples of the alkyl group having 2 or 3 carbon atoms include an ethyl group, a 1-methylethyl group, and a propyl group. Among them, an ethyl group is preferred. Specific examples of the alkyl group having 4 or more carbon atoms include, but are not particularly limited to, a butyl group, a pentyl group, a hexyl group, a heptyl group, and an octyl group. Among them, a butyl group and/or a hexyl group are preferred.

In the condition (3), specific examples of the hydrocarbon group having 6 or more carbon atoms include, but are not particularly limited to, a hexyl group, a heptyl group, an octyl group, a nonyl group, a decyl group, a phenyl group, and a 2-naphthyl group. Among these hydrocarbon groups, alkyl groups are preferred. Among the alkyl groups, a hexyl group and/or an octyl group are more preferred.

In general, an alkyl group containing a larger number of carbon atoms tends to be more soluble in an inert hydrocarbon solvent and tends to form a solution having a higher viscosity. A moderate long chain alkyl group is therefore preferably used in terms of handling. The organic magnesium compound is used as an inert hydrocarbon solution. This solution can be used without any problem even if trace amounts of Lewis basic compounds such as ethers, esters, and amines are contained or remain therein.

Next, the alkoxy group ($OR^{10}$) will be described. The hydrocarbon group represented by $R^{10}$ is preferably an alkyl group or an aryl group having 1 or more and 12 or less carbon atoms, particularly preferably an alkyl group or an aryl group having 3 or more and 10 or less carbon atoms. Specific examples of $R^{10}$ include, but are not particularly limited to, a methyl group, an ethyl group, a propyl group, a 1-methylethyl group, a butyl group, a 1-methylpropyl group, a 1,1-dimethylethyl group, a pentyl group, a hexyl group, a 2-methylpentyl group, a 2-ethylbutyl group, a 2-ethylpentyl group, a 2-ethylhexyl group, a 2-ethyl-4-methylpentyl group, a 2-propylheptyl group, a 2-ethyl-5-methyloctyl group, an octyl group, a nonyl group, a decyl group, a phenyl group, and a naphthyl group. Among them, any of a butyl group, a 1-methylpropyl group, a 2-methylpentyl group, and a 2-ethylhexyl group are preferred.

In the present embodiment, a method for synthesizing the compound (C-1) is not particularly limited, and is preferably a method of reacting an organic magnesium compound represented by any of the formulas $R^8MgX^1$ and $R^8{}_2Mg$ (wherein $R^8$ is as defined above, and $X^1$ represents a halogen atom) with an organic metal compound represented by any of the formulas $M^2R^9{}_k$ and $M^2R^9{}_{(k-1)}H$ (wherein $M^2$, $R^9$, and k are as defined above) at a temperature of 25° C. or more and 150° C. or less in an inert hydrocarbon solvent and, if necessary, subsequently with an alcohol having a hydrocarbon group represented by $R^9$ (wherein $R^9$ is as defined above) or an alkoxy magnesium compound and/or an alkoxy aluminum compound having a hydrocarbon group represented by $R^9$ which is soluble in an inert hydrocarbon solvent.

In the approach of reacting the organic magnesium compound soluble in an inert hydrocarbon solvent with an alcohol, the order in which the compounds are reacted is not particularly limited. Any of the following methods can be used: a method of adding the alcohol into the organic magnesium compound; a method of adding the organic magnesium compound into the alcohol; and a method of adding both of the compounds at the same time. In the present embodiment, the ratio between the organic magnesium compound soluble in an inert hydrocarbon solvent and the alcohol in the reaction is not particularly limited, and the molar composition ratio $g/(\gamma+\delta)$ of the alkoxy group to all metal atoms in an alkoxy group-containing organic magnesium compound obtained as a result of the reaction is $0 \leq g/(\gamma+\delta) \leq 2$, preferably $0 \leq g/(\gamma+\delta) < 1$.

Next, the compound (C-2) will be described. The compound (C-2) is a silicon chloride compound having at least one Si—H bond, represented by the formula 5:

$$(C\text{-}2): H_h SiCl_i R^{11}{}_{(4-(h+i))} \quad \text{Formula 5}$$

wherein $R^{11}$ represents a hydrocarbon group having 1 or more and 12 or less carbon atoms; and h and i each represent a real number that satisfies the following relationships: $0<h$, $0<i$, and $0<h+i \leq 4$.

In the formula 5, specific examples of the hydrocarbon group represented by $R^{11}$ include, but are not particularly limited to, aliphatic hydrocarbon groups, alicyclic hydrocarbon groups, and aromatic hydrocarbon groups, for example, methyl, ethyl, propyl, 1-methylethyl, butyl, pentyl, hexyl, octyl, decyl, cyclohexyl, and phenyl groups. Among them, alkyl groups having 1 or more and 10 or less carbon atoms are preferred, and alkyl groups having 1 to 3 carbon atoms, such as methyl, ethyl, propyl, and 1-methylethyl groups are more preferred. Each of h and i is a number more than 0 that satisfies the relationship $h+i \leq 4$. Preferably, i is 2 or more and 3 or less.

Specific examples of such a compound include, but not particularly limited to, $HSiCl_3$, $HSiCl_2CH_3$, $HSiCl_2C_2H_5$, $HSiCl_2$ $(C_3H_7)$, $HSiCl_2$ $(2\text{-}C_3H_7)$, $HSiCl_2$ $(C_4H_9)$, $HSiCl_2$ $(C_6H_5)$, $HSiCl_2$ $(4\text{-}Cl\text{—}C_6H_4)$, $HSiCl_2$ $(CH=CH_2)$, $HSiCl_2$ $(CH_2C_6H_5)$, $HSiCl_2$ $(1\text{-}C_{10}H_2)$, $HSiCl_2$ $(CH_2CH=CH_2)$, $H_2SiCl(CH_3)$, $H_2SiCl(C_2H_5)$, $HSiCl(CH_3)_2$, $HSiCl(C_2H_5)_2$, $HSiCl(CH_3)$ $(2\text{-}C_3H_7)$, $HSiCl$ $(CH_3)$ $(C_6H_5)$, and $HSiCl(C_6H_5)_2$. These silicon chloride compounds can be used each alone or in combination of two or more thereof. Among them, $HSiCl_3$, $HSiCl_2CH_3$, $HSiCl$ $(CH_3)_2$, and $HSiCl_2$ $(C_3H_7)$ are preferred, and $HSiCl_3$ and $HSiCl_2CH_3$ are more preferred.

Next, the reaction between the compounds (C-1) and (C-2) will be described. For the reaction, the compound (C-2) is preferably used after being diluted in advance with an inert hydrocarbon solvent, a chlorinated hydrocarbon (e.g., 1,2-dichloroethane, o-dichlorobenzene, or dichloromethane), an ether vehicle (e.g., diethyl ether or tetrahydrofuran), or a mixed vehicle thereof. Among them, an inert hydrocarbon solvent is more preferred in terms of the performance of the catalyst. The ratio between the compounds (C-1) and (C-2) in the reaction is not particularly limited and is preferably 0.01 mol or more and 100 mol or less, more preferably 0.1 mol or more and 10 mol or less, of silicon atom contained in the compound (C-2) per 1 mol of magnesium atom contained in the compound (C-1).

The method for reacting the compounds (C-1) and (C-2) is not particularly limited. Any of the following methods can be used: a simultaneous addition method in which the compounds (C-1) and (C-2) are reacted while introduced at the same time to a reactor; a method of charging a reactor with the compound (C-2) in advance and then introducing the compound (C-1) to the reactor; and a method of charging a reactor with the compound (C-1) in advance and then introducing the compound (C-2) to the reactor. Among them, the method of charging a reactor with the compound (C-2) in advance and then introducing the compound (C-1) to the reactor is preferred. The carrier (C-3) obtained by the reaction is preferably separated by filtration or decantation and then thoroughly washed with an inert hydrocarbon solvent to remove unreacted materials or by-products, etc.

The temperature of the reaction between the compounds (C-1) and (C-2) is not particularly limited and is preferably 0° C. or more and 50° C. or less, more preferably 3° C. or more and 30° C. or less, further preferably 5° C. or more and 20° C. or less. Reaction at a lower temperature facilitates the growth of the carrier into large particles and is therefore preferred. In the simultaneous addition method in which the compounds (C-1) and (C-2) are reacted while introduced at the same time to a reactor, the reaction temperature is preferably adjusted to a predetermined temperature by pre-adjusting the temperature of the reactor to a predetermined temperature and adjusting the internal temperature of the reactor to a predetermined temperature while performing the simultaneous addition. In the method of charging a reactor with the compound (C-2) in advance and then introducing the compound (C-1) to the reactor, the reaction temperature is preferably adjusted to a predetermined temperature by adjusting the temperature of the reactor charged with the silicon chloride compound to a predetermined temperature and adjusting the internal temperature of the reactor to a predetermined temperature while introducing the organic magnesium compound to the reactor. In the method of charging a reactor with the compound (C-1) in advance and then introducing the compound (C-2) to the reactor, the reaction temperature is adjusted to a predetermined temperature by adjusting the temperature of the reactor charged with the compound (C-1) to a predetermined temperature and adjusting the internal temperature of the reactor to a predetermined temperature while introducing the compound (C-2) to the reactor. The time for which the compounds (C-1) and (C-2) are introduced to a reactor is preferably 3 hours or longer and 20 hours or shorter, more preferably 5 hours or longer and 15 hours or shorter, particularly preferably 7 hours or longer and 13 hours or shorter. Reaction for a longer time facilitates the growth of the carrier into large particles and is therefore preferred. The catalyst carrier produced by this method is generally characterized by being larger than a carrier for use in Ziegler catalysts and aims to remain intentionally in a polyethylene powder after polymerization. This carrier is dissolved by a method described in Examples and thereby yields a more soluble polyethylene powder than usual polyethylene powders because the carrier has many voids in the inside.

Next, the organic magnesium compound (C-4) will be described. The compound (C-4) is represented by the formula 6.

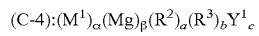   Formula 6 wherein $M^1$ represents a metal atom belonging to any of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms), and a β-keto acid residue, and a plurality of $Y^1$ moieties may be different from each other; and α, β, a, b, and c each represent a real number that satisfies the following relationships: 0≤α, 0<β, 0≤a, 0≤b, 0<a+b, 0≤b/(α+β)≤2, and nα+2β=a+b+c (wherein n represents the valence of $M^1$).

The amount of the compound (C-4) used is preferably 0.1 or more and 10 or less, more preferably 0.5 or more and 5 or less, in terms of the molar ratio of magnesium atom contained in the compound (C-4) to titanium atom contained in the compound (C-5).

The temperature of the reaction between the compounds (C-4) and (C-5) is not particularly limited and is preferably −80° C. or more and 150° C. or less, more preferably in the range of −40° C. or more and 100° C. or less.

The concentration of the compound (C-4) in use is not particularly limited and is preferably 0.1 mol/L or more and 2 mol/L or less, more preferably 0.5 mol/L or more and 1.5 mol/L or less, on the basis of titanium atom contained in the compound (C-4). An inert hydrocarbon solvent is preferably used for diluting the compound (C-4).

The order in which the compounds (C-4) and (C-5) are added to the carrier (C-3) is not particularly limited. Any of the following methods can be used: a method of adding the compound (C-5) subsequently to the compound (C-4); a method of adding the compound (C-4) subsequently to the compound (C-5); and a method of adding the compounds (C-4) and (C-5) at the same time. Among them, the method of adding the compounds (C-4) and (C-5) at the same time is preferred. The reaction between the compounds (C-4) and (C-5) is carried out in an inert hydrocarbon solvent, preferably in an aliphatic hydrocarbon solvent such as hexane or heptane. The catalyst thus obtained is used as a slurry solution with an inert hydrocarbon solvent.

Next, the compound (C-5) will be described. In the present embodiment, the compound (C-5) is a titanium compound represented by the formula 7.

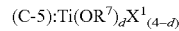   Formula 7 wherein d represents a real number of 0 or more and 4 or less; $R^7$ represents a hydrocarbon group having 1 or more and 20 or less carbon atoms; and X' represents a halogen atom.

In the formula 7, specific examples of the hydrocarbon group represented by $R^7$ include, but are not particularly limited to: aliphatic hydrocarbon groups such as a methyl group, an ethyl group, a propyl group, a butyl group, a pentyl group, a hexyl group, a 2-ethylhexyl group, a heptyl group, an octyl group, a decyl group, and an allyl group; alicyclic hydrocarbon groups such as a cyclohexyl group, a 2-methylcyclohexyl group, and a cyclopentyl group; and aromatic hydrocarbon groups such as a phenyl group and a naphthyl group. Among them, aliphatic hydrocarbon groups are preferred. Specific examples of the halogen represented by X' include, but are not particularly limited to, chlorine, bromine, and iodine. Among them, chlorine is preferred. One compound selected from these compounds (C-5) may be used alone, or two or more compounds selected therefrom may be used in combination.

The amount of the compound (C-5) used is not particularly limited and is preferably 0.01 or more and 20 or less, more preferably 0.05 or more and 10 or less, in terms of the molar ratio to magnesium atom contained in the carrier (C-3).

The reaction temperature for the compound (C-5) is not particularly limited and is preferably −80° C. or more and 150° C. or less, more preferably in the range of −40° C. or more and 100° C. or less. In the present embodiment, the method for allowing the compound (C-5) to be supported by the carrier (C-3) is not particularly limited and may involve reacting an excess of the compound (C-5) with the carrier (C-3) or using a third component to efficiently support the compound (C-5). A method of supporting the compound (C-5) through the reaction between the compound (C-5) and the organic magnesium compound (C-4) is preferred.

Next, the organic metal compound component [B] according to the present embodiment will be described. The solid catalytic component of the present embodiment can serve as a highly active catalyst for polymerization by combination with the organic metal compound component [B]. The organic metal compound component [B] is also called a "promoter." The organic metal compound component [B] is preferably a compound containing a metal belonging to any of groups 1, 2, 12, and 13 of the periodic system, particularly preferably an organic aluminum compound and/or an organic magnesium compound.

Compounds represented by the following formula 8 are preferably used each alone or as a mixture as the organic aluminum compound:

$$AlR^{12}{}_j Z^1{}_{(3-j)} \quad \text{Formula 8}$$

wherein $R^{12}$ represents a hydrocarbon group having 1 or more and 20 or less carbon atoms; $Z^1$ represents a group belonging to the group consisting of hydrogen, halogen, an alkoxy group, an allyloxy group, and a siloxy group; and j represents any number of 2 or more and 3 or less.

In the formula 8, specific examples of the hydrocarbon group having 1 or more and 20 or less carbon atoms, represented by $R^{12}$ include, but are not particularly limited to, aliphatic hydrocarbons, aromatic hydrocarbons, and alicyclic hydrocarbons. Preferred examples of the compound represented by the formula 8 include: trialkyl aluminum compounds such as trimethyl aluminum, triethyl aluminum, tripropyl aluminum, tributyl aluminum, tri(2-methylpropyl) aluminum (or triisobutyl aluminum), tripentyl aluminum, tri(3-methylbutyl) aluminum, trihexyl aluminum, trioctyl aluminum, and tridecyl aluminum; aluminum halide compounds such as diethyl aluminum chloride, ethyl aluminum dichloride, bis(2-methylpropyl) aluminum chloride, ethyl aluminum sesquichloride, and diethyl aluminum bromide; alkoxy aluminum compounds such as diethyl aluminum ethoxide and bis(2-methylpropyl) aluminum butoxide; siloxy aluminum compounds such as dimethylhydrosiloxy aluminum dimethyl, ethylmethylhydrosiloxy aluminum diethyl, and ethyldimethylsiloxy aluminum diethyl; and mixtures thereof. Among them, trialkyl aluminum compounds are more preferred.

The organic magnesium compound is preferably an organic magnesium compound represented by the formula 4 which is soluble in an inert hydrocarbon solvent:

$$(M^2)_\gamma (Mg)_\delta (R^8)_e (R^9)_f (OR^{10})_g \quad \text{Formula 4}$$

wherein $M^2$ represents a metal atom belonging to any of groups 12, 13, and 14 of the periodic system; $R^8$, $R^9$, and $R^{10}$ each represent a hydrocarbon group having 2 or more and 20 or less carbon atoms; and $\gamma$, $\delta$, e, f, and g each represent a real number that satisfies the following relationships: $0 \leq \gamma$, $0 < \delta$, $0 \leq e$, $0 \leq f$, $0 \leq g$, $0 < e+f$, $0 \leq g/(\gamma+\delta) \leq 2$, and $k\gamma + 2\delta = e+f+g$ (wherein k represents the valence of $M^2$).

This organic magnesium compound is represented in the form of an organic magnesium complex compound soluble in an inert hydrocarbon solvent, and encompasses all of dialkyl magnesium compounds and their complexes with other metal compounds. Although $\gamma$, $\delta$, e, f, g, $M^2$, $R^8$, $R^9$, and $OR^{10}$ are as already defined, this organic magnesium compound is preferably a compound wherein the ratio $\delta/\gamma$ is in the range of 0.5 to 10 and $M^2$ is aluminum because a compound having higher solubility in an inert hydrocarbon solvent is more preferred.

The method for adding the solid catalytic component and the organic metal compound component [B] into a polymerization system placed under polymerization conditions is not particularly limited. These components may be separately added into the polymerization system, or the components may be reacted in advance and then added into the polymerization system. The ratio between the components to be combined is not particularly limited and is preferably 1 mmol or more and 3,000 mmol or less of the organic metal compound component [B] per 1 g of the solid catalytic component.

Next, the metallocene catalyst will be described. The metallocene catalyst of the present embodiment is not particularly limited and is preferably a supported constrained geometry metallocene catalyst prepared from at least (I) a carrier substance (hereinafter, also referred to as a "component (I)" or "(I)"), (II) an organic aluminum compound (hereinafter, also referred to as a "component (II)" or "(II)"), (III) a transition metal compound having a cyclic η-binding anionic ligand (hereinafter, also referred to as a "component (III)" or "(III)"), and (IV) an activating agent capable of forming a complex that exerts catalytic activity through reaction with the transition metal compound having a cyclic η-binding anionic ligand (hereinafter, also referred to as a "component (IV)" or "(IV)").

The carrier substance (I) can be any of an organic carrier and an inorganic carrier. Examples of the organic carrier include, but are not particularly limited to, (co)polymers of α-olefins having 2 to 10 carbon atoms. Examples of the (co)polymers of α-olefins having 2 to 10 carbon atoms include: polyethylene, polypropylene, polybutene-1, ethylene-propylene copolymers, ethylene-butene-1 copolymers, ethylene-hexene-1 copolymers, propylene-butene-1 copolymers, and propylene-divinylbenzene copolymers; aromatic unsaturated hydrocarbon polymers, for example, polystyrene and styrene-divinylbenzene copolymers; and polar group-containing polymers, for example, polyacrylic acid ester, polymethacrylic acid ester, polyacrylonitrile, polyvinyl chloride, polyamide, and polycarbonate. Examples of the inorganic carrier include, but are not particularly limited to: inorganic oxides such as $SiO_2$, $Al_2O_3$, MgO, $TiO_2$, $B_2O_3$, CaO, ZnO, BaO, ThO, $SiO_2$—MgO, $SiO_2$—$Al_2O_3$, and $SiO_2$—$V_2O_5$; inorganic halogen compounds such as $MgCl_2$, $AlCl_3$, and $MnCl_2$; inorganic carbonates, sulfates, and nitrates such as $Na_2CO_3$, $K_2CO_3$, $CaCO_3$, $MgCO_3$, $Al_2(SO_4)_3$, $BaSO_4$, $KNO_3$, and $Mg(NO_3)_2$; and hydroxides such as $Mg(OH)_2$, $Al(OH)_3$, and $Ca(OH)_2$. Among them, $SiO_2$ is preferred as the carrier substance. The particle size of the carrier substance can adopt an arbitrary value and is preferably 1.0 μm or more and 100 μm or less, more preferably 2.0 μm or more and 50 μm or less, further preferably 3.0 μm or more and 10 μm or less.

The carrier substance (I) is preferably treated, if necessary, with the organic aluminum compound (II). Preferred examples of the organic aluminum compound (II) include, but are not particularly limited to: alkyl aluminums such as trimethyl aluminum, triethyl aluminum, triisobutyl aluminum, trihexyl aluminum, and trioctyl aluminum; alkyl aluminum hydrides such as diethyl aluminum hydride and diisobutyl aluminum hydride; aluminum alkoxides such as diethyl aluminum ethoxide and dimethyl aluminum methoxide; and aluminoxanes such as methylaluminoxane, isobutylaluminoxane, and methylisobutylaluminoxane. Among them, trialkyl aluminums and aluminum alkoxides are preferred, and trimethyl aluminum, triethyl aluminum, and triisobutyl aluminum are more preferred.

The supported constrained geometry metallocene catalyst can contain (III) a transition metal compound having a cyclic η-binding anionic ligand (hereinafter, also simply referred to as a "transition metal compound"). The transition metal compound of the present embodiment is not particularly limited and can be represented by, for example, the following formula 9:

  Formula 9

In the formula 9, M represents a transition metal belonging to group 4 of the periodic system, wherein the transition metal is bonded to at least one ligand L via η$^5$ bond and has an oxidation number of +2, +3, or +4.

In the formula 9, each L independently represents a cyclic η-binding anionic ligand. The cyclic η-binding anionic ligand is a cyclopentadienyl group, an indenyl group, a tetrahydroindenyl group, a fluorenyl group, a tetrahydrofluorenyl group, or an octahydrofluorenyl group. Each of these groups optionally has 1 to 8 substituents each independently selected from hydrocarbon groups containing up to 20 non-hydrogen atoms, halogen, halogen-substituted hydrocarbon groups, aminohydrocarbyl groups, hydrocarbyloxy groups, dihydrocarbylamino groups, hydrocarbylphosphino groups, a silyl group, an aminosilyl group, hydrocarbyloxysilyl groups, and halosilyl groups. Two L moieties may be bonded through a divalent substituent such as hydrocarbadiyl containing up to 20 non-hydrogen atoms, halohydrocarbadiyl hydrocarbyleneoxy, hydrocarbyleneamino, siladiyl, halosiladiyl, or aminosilane.

In the formula 9, each X independently represents a monovalent anionic σ-binding ligand having up to 60 non-hydrogen atoms, a divalent anionic σ-binding ligand divalently binding to M, or a divalent anionic σ-binding ligand monovalently binding to each of M and L. Each X' independently represents a neutral Lewis base-coordinating compound having 4 to 40 carbon atoms, selected from phosphines, ethers, amines, olefins and conjugated dienes.

In the formula 9, 1 represents an integer of 1 or 2. p represents an integer of 0, 1, or 2 provided that: when X represents a monovalent anionic σ-binding ligand or a divalent anionic σ-binding ligand monovalently binding to each of M and L, p represents an integer smaller by at least 1 than the formal oxidation number of M; and when X represents a divalent anionic σ-binding ligand divalently binding to M, p represents an integer smaller by at least 1+1 than the formal oxidation number of M. q represents an integer of 0, 1, or 2. The transition metal compound is preferably a compound represented by the formula 9 wherein 1 represents 1.

A preferred example of the transition metal compound is a compound represented by the following formula 10:

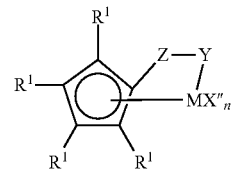

Formula 10

In the formula 10, M represents titanium, zirconium, or hafnium having a formal oxidation number of +2, +3, or +4. In the formula 10, each R$^1$ independently represents hydrogen, a hydrocarbon group, a silyl group, a germyl group, a cyano group, halogen, or a combination thereof, and each of these groups can have up to 20 non-hydrogen atoms. Also, proximal R$^1$ moieties may together constitute a ring by forming a divalent derivative such as hydrocarbadiyl, siladiyl, or germadiyl.

In the formula 10, each X" independently represents halogen, a hydrocarbon group, a hydrocarbyloxy group, a hydrocarbylamino group, or a silyl group, and each of these groups has up to 20 non-hydrogen atoms. Also, two X" moieties may form a neutral conjugate diene having 5 to 30 carbon atoms or a divalent derivative. Y represents —O—, —S—, —NR$^3$— or —PR$^3$—, and Z represents SiR$^3_2$, CR$^3_2$, SiR$^3_2$SiR$^3_2$, CR$^3_2$CR$^3_2$, CR$^3$=CR$^3$, CR$^3_2$SiR$^3_2$ or GeR$^3_2$, wherein each R$^3$ independently represents an alkyl group or an allyl group having 1 to 12 carbon atoms. n represents an integer of 1 to 3.

A more preferred example of the transition metal compound is a compound represented by the following formula 11 or 12:

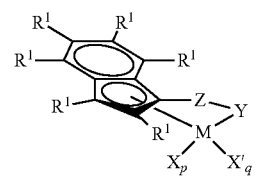

Formula 11

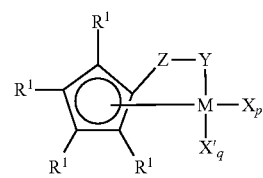

Formula 12

In each of the formulas 11 and 12, each R$^1$ independently represents hydrogen, a hydrocarbon group, a silyl group, a germyl group, a cyano group, halogen, or a combination thereof, and each of these groups can have up to 20 non-hydrogen atoms. M represents titanium, zirconium, or hafnium. Z, Y, X and X' are as defined in the formula 10.

In each of the formulas 11 and 12, p represents 0, 1 or 2, and q represents 0 or 1. When p represents 2 and q represents 0, the oxidation number of M is +4 and X is halogen, a hydrocarbon group, a hydrocarbyloxy group, a dihydrocarbylamide group, a dihydrocarbyl phosphide group, a hydrocarbyl sulfide group, a silyl group, or a combination thereof and represents a group having up to 20 non-hydrogen atoms.

In each of the formulas 11 and 12, when p represents 1 and q represents 0, the oxidation number of M is +3 and X represents a stabilized anionic ligand selected from an allyl group, a 2-(N,N-dimethylaminomethyl)phenyl group and a 2-(N,N-dimethyl)-aminobenzyl group; the oxidation number of M is +4 and X represents a divalent conjugated diene derivative; or M and X together forms a metallocyclopentene group.

In each of the formulas 11 and 12, when p represents 0 and q represents 1, the oxidation number of M is +2 and X' is a neutral conjugated or non-conjugated diene optionally substituted by one or more hydrocarbon groups, and X' can contain up to 40 carbon atoms and forms a n complex with M.

A further preferred example of the transition metal compound is a compound represented by the following formula 13 or 14:

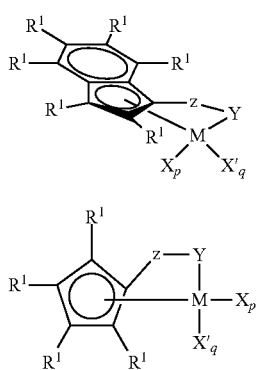

Formula 13

Formula 14

In each of the formulas 13 and 14, each $R^1$ independently represents hydrogen or an alkyl group having 1 to 6 carbon atoms. M represents titanium. Y represents —O—, —S—, —NR$^3$—, or —PR$^3$—. Z represents $SiR^3_2$, $CR^3_2$, $SiR^3_2SiR^3_2$, $CR^3_2CR^3_2$, $CR^3$=$CR^3$, $CR^3_2SiR^3_{-2}$, or $GeR^3_2$. Each $R^3$ independently represents hydrogen, a hydrocarbon group, a hydrocarbyloxy group, a silyl group, an alkyl halide group, an allyl halide group, or a combination thereof, and each of these groups can have up to 20 non-hydrogen atoms. If necessary, two $R^3$ moieties in Z, or $R^3$ in Z and $R^3$ in Y may together constitute a ring.

In each of the formulas 13 and 14, p represents 0, 1 or 2, and q represents 0 or 1. When p represents 2 and q represents 0, the oxidation number of M is +4 and each X independently represents a methyl group or a benzyl group. When p represents 1 and q represents 0, the oxidation number of M is +3 and X represents 2-(N,N-dimethyl)aminobenzoyl, or the oxidation number of M is +4 and X represents 2-butene-1,4-diyl. When p represents 0 and q represents 1, the oxidation number of M is +2 and X' represents 1,4-diphenyl-1,3-butadiene or 1,3-pentadiene. These dienes illustrate asymmetric dienes that form metal complexes, and are actually respective mixtures of geometric isomers.

The supported constrained geometry metallocene catalyst contains (IV) an activating agent capable of forming a complex that exerts catalytic activity through reaction with the transition metal compound (hereinafter, also simply referred to as an "activating agent"). In a general metallocene catalyst, a transition metal compound and a complex formed with the activating agent exhibit high olefin polymerization activity as catalytic active species. In the present embodiment, examples of the activating agent include, but are not particularly limited to, compounds represented by the following formula 15:

[L-H]$^{d+}$[M$_m$Q$_p$]$^{d-}$     Formula 15

In the formula 15, [L-H]$^{d+}$ represents a proton-donating Bronsted acid wherein L represents a neutral Lewis base. [M$_m$Q$_p$]$^{d-}$ represents a compatible non-coordinating anion wherein M represents a metal selected from groups 5 to 15 of the periodic system, or a metalloid, each Q independently represents a hydride, a dialkylamide group, a halide, an alkoxy group, an allyloxy group, a hydrocarbon group, or a substituted hydrocarbon group having up to 20 carbon atoms, and the number of the halide represented by Q is 1 or less. m represents an integer of 1 to 7, p represents an integer of 2 to 14, and d represents an integer of 1 to 7, provided that p−m=d.

A preferred example of the activating agent is a compound represented by the following formula 16:

[L-H]$^{d+}$[M$_m$Q$_n$(G$_q$(T-H)$_r$)$_z$]$^{d-}$     Formula 16

In the formula 16, [L-H]$^{d+}$ represents a proton-donating Bronsted acid wherein L represents a neutral Lewis base. [M$_m$Q$_n$(G$_q$(T-H)$_r$)$_z$]$^{d-}$ represents a compatible non-coordinating anion wherein M represents a metal selected from groups 5 to 15 of the periodic system, or a metalloid, each Q independently represents a hydride, a dialkylamide group, a halide, an alkoxy group, an allyloxy group, a hydrocarbon group, or a substituted hydrocarbon group having up to 20 carbon atoms, and the number of the halide represented by Q is 1 or less. G represents a polyvalent hydrocarbon group having a valence of r+1 and binding to M and T wherein T represents O, S, NR, or PR. In this context, R represents hydrocarbyl, a trihydrocarbylsilyl group, a trihydrocarbyl germanium group or hydrogen. m represents an integer of 1 to 7, n represents an integer of 0 to 7, q represents an integer of 0 or 1, r represents an integer of 1 to 3, z represents an integer of 1 to 8, and d represents an integer of 1 to 7, provided that n+z−m=d.

A further preferred examples of the activating agent is a compound represented by the following formula 17.

[L-H]$^+$[BQ$_3$Q$^1$]$^-$     Formula 17

In the formula 17, [L-H]$^+$ represents a proton-donating Bronsted acid wherein L represents a neutral Lewis base. [BQ$_3$Q$^1$]$^-$ represents a compatible non-coordinating anion wherein B represents a boron element, each Q independently represents a pentafluorophenyl group, and Q1 represents a substituted allyl group having 6 to 20 carbon atoms and having one OH group as a substituent.

Examples of the proton-donating Bronsted acid include, but are not particularly limited to: trialkyl group-substituted ammonium cations such as triethylammonium, tripropylammonium, tri(n-butyl)ammonium, trimethylammonium, tributylammonium, tri(n-octyl)ammonium, diethylmethylammonium, dibutylmethylammonium, dibutylethylammonium, dihexylmethylammonium, dioctylmethylammonium, didecylmethylammonium, didodecylmethylammonium, ditetradecylmethylammonium, dihexadecylmethylammonium, dioctadecylmethylammonium, diicosylmethylammonium, and bis(hydrogenated tallow alkyl)methylammonium; N,N-dialkylanilinium cations such as N,N-dimethylanilinium, N,N-diethylanilinium, N,N-2,4,6-pentamethylanilinium, and N,N-dimethylbenzylanilinium; and triphenylcarbonium cations.

Examples of the compatible non-coordinating anion include, but are not particularly limited to, triphenyl(hydroxyphenyl) borate, diphenyl-di(hydroxyphenyl) borate, triphenyl(2,4-dihydroxyphenyl) borate, tri(p-tolyl) (hydroxyphenyl) borate, tris(pentafluorophenyl) (hydroxyphenyl) borate, tris(2,4-dimethylphenyl) (hydroxyphenyl) borate, tris(3,5-dimethylphenyl) (hydroxyphenyl) borate, tris(3,5-di-trifluoromethylphenyl) (hydroxyphenyl) borate, tris(pentafluorophenyl) (2-hydroxyethyl) borate, tris(pentafluorophenyl) (4-hydroxybutyl) borate, tris(pentafluorophenyl) (4-hydroxy-cyclohexyl) borate, tris(pentafluorophenyl) (4-(4'-hydroxyphenyl)phenyl) borate, and tris (pentafluorophenyl) (6-hydroxy-2-naphthyl) borate. These compatible non-coordinating anions are also referred to as "borate compounds". The activating agent in the supported constrained geometry metallocene catalyst is preferably a borate compound from the viewpoint of catalytic activity and from the viewpoint of reducing the total content of Al, Mg, Ti, Zr and Hf. Preferred examples of the borate compound include tris(pentafluorophenyl) (hydroxyphenyl) borate.

An organic metal oxy compound having a unit represented by the following formula 18 may be used as the activating agent:

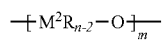
Formula 18 wherein $M^2$ represents a metal of any of groups 13 to 15 of the periodic system, or a metalloid, each R independently represents a hydrocarbon group having 1 to 12 carbon atoms or a substituted hydrocarbon group, n represents the valence of the metal $M^2$, and m represents an integer of 2 or more.

Another preferred example of the activating agent is an organic aluminum oxy compound containing a unit represented by the following formula 19:

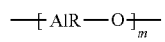
Formula 19 wherein R represents an alkyl group having 1 to 8 carbon atoms, and m represents an integer of 2 to 60.

A more preferred example of the activating agent is methylaluminoxane containing a unit represented by the following formula 20:

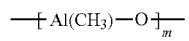
Formula 20 wherein m represents an integer of 2 to 60.

In addition to the components (I) to (IV), an organic aluminum compound may be used, if necessary, as the catalyst. Examples of the organic aluminum compound include, but are not particularly limited to, compounds represented by the following formula 21:

  $AlR_nX_{3-n}$     Formula 21

In the formula 21, R represents a linear, branched, or cyclic alkyl group having 1 to 12 carbon atoms or an allyl group having 6 to 20 carbon atoms, X represents halogen, hydrogen or an alkoxyl group, and n represents an integer of 1 to 3. Alternatively, the organic aluminum compound may be a mixture of compounds represented by the formula 21.

The catalyst can be obtained by allowing the component (II), the component (III), and the component (IV) to be supported by the component (I). Examples of the method for allowing the component (II), the component (III), and the component (IV) to be supported include, but are not particularly limited to: a method of dissolving the component (II), the component (III) and the component (IV) in an inert solvent capable of dissolving each of the components, mixing the solution with the component (I), and then distilling off the solvent; a method of dissolving the component (II), the component (III) and the component (IV) in an inert solvent, then concentrating the solution without depositing a solid, and subsequently adding the component (I) in an amount that can retain the whole amount of the concentrate in the particles; a method of first allowing the component (II) and the component (IV) to be supported by the component (I), and subsequently allowing the component (III) to be supported thereby; and a method of sequentially allowing the component (II) and the component (IV), and the component (III) to be supported by the component (I). Each of the component (III) and the component (IV) of the present embodiment is preferably a liquid or a solid. The component (II), the component (III), or the component (IV) may be diluted with an inert solvent and used in the supporting.

Examples of the inert solvent include, but are not particularly limited to: aliphatic hydrocarbons such as isobutane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; and mixtures thereof. Such an inert solvent is preferably used by removing impurities such as water, oxygen, and sulfur using a desiccant, an adsorbent, or the like. Each component is used in the range of preferably $1.0 \times 10^{-5}$ to $1.0 \times 10^{-1}$ mol, more preferably $1.0 \times 10^{-4}$ to $5.0 \times 10^{-2}$ mol, in terms of Al atom for the component (II), preferably $1.0 \times 10^{-7}$ to $1.0 \times 10^{-3}$ mol, more preferably $5.0 \times 10^{-7}$ to $5.0 \times 10^{-4}$ mol, for the component (III), and preferably $1.0 \times 10^{-7}$ to $1.0 \times 10^{-3}$ mol, more preferably $5.0 \times 10^{-7}$ to $5.0 \times 10^{-4}$ mol, for the component (IV), per 1.0 g of the component (I). The amount of each component used and the supporting method are determined depending on activity, economic performance, powder characteristics, and the internal scale of a reactor, etc. The obtained supported constrained geometry metallocene catalyst may be washed by a method such as decantation or filtration using an inert solvent for the purpose of removing the organic aluminum compound, the borate compound, or the titanium compound unsupported by the carrier.

A series of operations such as dissolution, contact, and washing described above are preferably carried out at a temperature of −30° C. or more and 80° C. or less selected on a unit operation basis. The range of such a temperature is more preferably 0° C. or more and 50° C. or less. A series of operations of obtaining the supported constrained geometry metallocene catalyst are preferably carried out in a dry inert atmosphere.

The supported constrained geometry metallocene catalyst itself permits homopolymerization of ethylene or copolymerization of ethylene with an α-olefin, and may be used in the presence of an organic aluminum compound as an additional component in order to prevent the poisoning of a solvent or reaction. Preferred examples of the organic aluminum compound include, but are not particularly limited to: alkyl aluminums such as trimethyl aluminum, triethyl aluminum, triisobutyl aluminum, trihexyl aluminum, and trioctyl aluminum; alkyl aluminum hydrides such as diethyl aluminum hydride and diisobutyl aluminum hydride; aluminum alkoxides such as diethyl aluminum ethoxide; and aluminoxanes such as methylaluminoxane, isobutylaluminoxane, and methylisobutylaluminoxane. Among them, trialkyl aluminums and aluminum alkoxides are preferred. Triisobutyl aluminum is more preferred.

[Method for Producing Ethylene Polymer]

Examples of the polymerization method in the method for producing the ethylene polymer of the present embodiment include methods of (co)polymerizing ethylene or monomers including ethylene by a suspension polymerization or vapor-phase polymerization method. Among them, the suspension polymerization method is preferred because this method can efficiently remove polymerization heat. In the suspension polymerization method, an inert hydrocarbon vehicle can be used as a vehicle. The olefin itself can also be used as a solvent.

Specific examples of the inert hydrocarbon vehicle can include, but are not particularly limited to: aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

In the method for producing the ethylene polymer of the present embodiment, the polymerization temperature is usually preferably 30° C. or more and 100° C. or less, more preferably 35° C. or more and 90° C. or less, further preferably 40° C. or more and 80° C. or less. The polymerization temperature equal to or more than 30° C. permits efficient industrial production. On the other hand, the polymerization temperature equal to or less than 100° C. permits continuous stable operation.

In the method for producing the ethylene polymer of the present embodiment, the polymerization pressure is usually preferably atmospheric pressure or more and 2 MPa or less, more preferably 0.1 MPa or more and 1.5 MPa or lower, further preferably 0.1 MPa or more and 1.0 MPa or less.

Comonomer-rich components can be unevenly distributed in the inside of the polyethylene powder by increasing the amount of comonomers in the course of the polymerization reaction. This facilitates dissolving the central portion of the powder prone to remain undissolved in liquid paraffin and is less likely to cause disadvantages, which is preferred. Such facilitated dissolution of the central portion of the powder also accelerates a dissolution rate, which is preferred.

The format of polymerization is preferably a batch method or a continuous method using a plurality of polymerization reactors for increasing the amount of comonomers in the course of the polymerization reaction. Continuous polymerization is particularly preferred. A partial high-temperature state ascribable to rapid ethylene reaction can be suppressed by continuously supplying ethylene gas, a solvent, a catalyst, etc., into the polymerization system while continuously discharging them together with produced ethylene polymers. Thus, the polymerization system is further stabilized. Ethylene reaction in a homogeneous state in the system prevents the formation of branches, double bonds, or the like in polymer chains, or prevents the formation of low-molecular-weight components or ultrahigh-molecular-weight forms ascribable to the degradation or cross-linking of ethylene polymers. Thus, crystalline components of the ethylene polymers are easily formed. This facilitates obtaining the crystalline components in a necessary amount sufficient for the strength of films, microporous membranes, or the like. Accordingly, the continuous method, which achieves a more homogeneous polymerization system, is preferred.

The molecular weight of the ethylene polymer can be adjusted by the presence of hydrogen in the polymerization system or by the change of the polymerization temperature, for example, as described in the specification of West German Patent Application Publication No. 3127133. The addition of hydrogen as a chain transfer agent into the polymerization system can control the molecular weight within a proper range. In the case of adding hydrogen into the polymerization system, the mole fraction of the hydrogen is preferably 0 mol % or more and 30 mol % or less, more preferably 0 mol % or more and 25 mol % or less, further preferably 0 mol % or more and 20 mol % or less.

Hydrogen is preferably contacted with a catalyst in advance and then added into the polymerization system from a catalyst inlet line. Immediately after introduction of the catalyst into the polymerization system, the catalyst concentration is high near the exit of the inlet line, and the possibility of a partial high-temperature state is increased due to rapid ethylene reaction. However, the contact of hydrogen with the catalyst before introduction into the polymerization system can reduce the initial activity of the catalyst and can also suppress secondary reaction, etc. which interferes with the formation of crystalline components. Accordingly, the introduction of hydrogen in contact with the catalyst into the polymerization system is preferred.

For similar reasons, the exit of the catalyst inlet line in the polymerization system is preferably positioned as distant as possible from the exit of an ethylene inlet line. Specific examples of the method therefor include methods of introducing ethylene from the bottom of the polymerization solution, and introducing the catalyst from the intermediate portion between the surface and the bottom of the polymerization solution.

In the method for producing the ethylene polymer of the present embodiment, the solvent can be separated by a method such as decantation, centrifugation, or filtration through a filter. Centrifugation having good efficiency of separation of the solvent from the ethylene polymer is more preferred. After the solvent separation, the amount of the solvent contained in the ethylene polymer is not particularly limited and is 70% by mass or less, more preferably 60% by mass or less, further preferably 50% by mass or less, with respect to the weight of the ethylene polymer. The solvent is removed by drying in a state where the solvent is contained in a small amount in the ethylene polymer so that metal components, low-molecular-weight components, or the like contained in the solvent tend to be less likely to remain in the ethylene polymer. In the absence of these components remaining therein, crystalline components of the ethylene polymer are easily formed. This facilitates obtaining the crystalline components in a necessary amount sufficient for the strength of films, microporous membranes, or the like. Accordingly, the separation of the solvent from the ethylene polymer by centrifugation is preferred.

The method for inactivating the catalyst used for synthesizing the ethylene polymer of the present embodiment is not particularly limited and is preferably carried out after the separation of the solvent from the ethylene polymer. The deposition of low-molecular-weight components contained in the solvent, catalytic components, or the like can be reduced by introducing an agent for inactivating the catalyst to the ethylene polymer thus separated from the solvent.

Examples of the agent inactivating the catalyst system can include oxygen, water, alcohols, glycols, phenols, carbon monoxide, carbon dioxide, ethers, carbonyl compounds, and alkynes.

In the method for producing the ethylene polymer of the present embodiment, the drying temperature is usually preferably 50° C. or more and 150° C. or less, more preferably 50° C. or more and 140° C. or less, further preferably 50° C.

or more and 130° C. or less. The drying temperature equal to or more than 50° C. permits efficient drying. On the other hand, the drying temperature equal to or less than 150° C. permits drying while the degradation or cross-linking of the ethylene polymer is prevented. The method according to the present embodiment can involve other components known in the art to be useful in ethylene polymer production, in addition to each of the components as described above.

EXAMPLES

Hereinafter, the present invention will be described further specifically with reference to Examples. However, the present invention is not limited by these Examples. The preparation of each component, etc. and the evaluation of physical properties in Examples and Comparative Examples were carried out by the methods given below.

(MFR)

The MFR of each of polyethylene powders of Examples and Comparative Examples was measured at 190° C. under a load of 21.6 kg according to ASTM-D-1238. Larger MFR improves fluidity and accelerates a shutdown rate at a high temperature and therefore improves fuse performance, which is preferred. The evaluation criteria are as follows.
◎: 5.0 g/10 min or more
○: less than 5.0 g/10 min and 1.0 g/10 min or more
x: less than 1.0 g/10 min (Apparent Density)

Each of polyethylene powders of Examples and Comparative Examples was travelled down in a 100 cc cylindrical container until overflowing via a funnel and orifice based on JIS K 6891. An excess of the powder was scraped off from the upper face of the container using a spatula or the like. The mass of the polyethylene powder in the container was measured, and the mass of the vacant container for measurement measured in advance was subtracted from the measured mass to determine the mass of the polyethylene powder. The bulk density was measured according to the following expression:

Bulk density(g/cc)=Mass(g) of the powder/100 (cc)

(Measurement of Kneading Torque)

16 g of each of polyethylene powders of Examples and Comparative Examples and 24 g of liquid paraffin (product name: Smoil P-350P) manufactured by MORESCO Corp., were added to Labo Plastomill Mixer (unit model: 4C150, mixer model: R-60) manufactured by Toyo Seiki Seisakusho, Ltd., and kneaded under conditions of a set temperature of 114° C. and a rotational speed of 5 rpm for 10 minutes. Then, 16 g of the polyethylene powder and 0.4 g of tetrakis[methylene(3,5-di-t-butyl-4-hydroxy-hydrocinnamate)]methane (product name: ANOX20) manufactured by Great Lakes Chemical Japan were added thereto, and the mixture was kneaded at a rotational speed of 30 rpm for 3 minutes. Then, the set temperature was elevated from 114° C. to 163° C. over 6 minutes. Peaks were confirmed from a chart of average torque calculated using Labo Plastomill Mixer Test Program Ver. 4.52 (copyright©, Toyo Seiki Seisaku-sho, Ltd.).

(Chlorine Content)

After combustion of each of polyethylene powders of Examples and Comparative Examples in an automatic sample combustion apparatus (Mitsubishi Chemical Analytech Co., Ltd. product "AQF-100"), the resultant was absorbed into an absorbent solution (mixed solution of $Na_2CO_3$ and $NaHCO_3$), and the absorbent solution was injected to an ion chromatograph apparatus (Dionex Corp. product "ICS1500", column (separation column: AS12A, guard column: AG12A) "Suppressor ASRS300"), followed by chlorine content measurement.

(Amount of Lubricant Added)

A lubricant in each of polyethylene powders of Examples and Comparative Examples was extracted for 6 hours by Soxhlet extraction using tetrahydrofuran (THF). The extracted solution was separated and quantified by liquid chromatography to determine the amount of the lubricant added.

(Cross-Fractionation Chromatography (CFC) Measurement)

CFC measurement was carried out as to each of polyethylene powders of Examples and Comparative Examples using Polymer Characterization, S.A. product "Automated 3D analyzer CFC-2". The TREF column used was a stainless steel microball column (outside diameter: ⅜ inches, length: 150 mm). The GPC columns used were a total of three columns composed of one column of Shodex product "GPC UT-807" and two columns of Tosoh Corp. product "$GMH_{HR}H(S)HT$". An eluant o-dichlorobenzene (for high-performance liquid chromatograph) was injected at a flow rate of 1.0 ml/min.

The column containing a packing material was heated to 140° C., and 20 ml of a sample solution (sample concentration: 1.0 mg/ml) of the polyethylene powder dissolved in o-dichlorobenzene was introduced thereto and kept for 120 minutes. Next, the temperature of the column was lowered to 40° C. at a cooling rate of 0.5° C./min and then kept for 20 minutes. In this step, the sample was deposited on the surface of the packing material.

Then, the temperature of the column was adjusted as follows: the temperature was raised to 50° C., kept at 50° C., subsequently raised to 60° C., and kept at 60° C. The temperature was further raised and kept at 5° C. intervals from 60° C. to 75° C., raised and kept at 3° C. intervals from 75° C. to 90° C., and raised and kept at 1° C. intervals from 90° C. to 120° C. Each course of heating involved heating at a rate of 20° C./min and keeping the resulting retention temperature for 21 minutes.

The concentration (% by mass) of a sample (polyethylene powder) eluted during keeping at each retention temperature for 21 minutes was detected, and an elution temperature-eluate volume curve and an elution temperature-cumulative eluate volume curve were obtained from the retention temperatures and the eluted sample concentrations. The weight-average molecular weight ($M_w$) of the component eluted during keeping at each retention temperature for 21 minutes was determined using the GPC columns connected to the TREF column.

(Melting Point (DSC) Measurement)

A DSC curve was obtained according to the following procedures and conditions using PerkinElmer, Inc. product "DSC-7 Differential Scanning calorimeter".
1) An aluminum pan was packed with approximately 5 mg of a sample of each of polyethylene powders of Examples and Comparative Examples, heated to 200° C. at a rate of 200° C./min, and kept at 200° C. for 5 minutes.
2) Next, the sample was cooled from 200° C. to 50° C. at a cooling rate of 10° C./min and kept for 5 minutes after the completion of the cooling.
3) Next, the sample was heated from 50° C. to 200° C. at a heating rate of 10° C./min.

From the DSC curve observed in the course of the procedure 3), the highest temperature at a melting peak position was regarded as a melting point (° C.). A melting point (° C.) less than 135° C. indicates that preferred fuse performance (particularly, a fuse at a low temperature) is obtained. The evaluation criteria are as follows.

Evaluation Criteria
⊚: less than 132° C.
○: 132° C. or more and less than 135° C.
x: 135° C. or more (Method for Producing Microporous Membrane)

To 100 parts by mass of each of polyethylene powders of Examples and Comparative Examples, 0.3 parts by mass of an antioxidant pentaerythrityl-tetrakis-[3-(3,5-di-t-butyl-4-hydroxyphenyl)propionate] were added, and the mixture was dry-blended using a tumbler blender to obtain a polyethylene mixture. After purging with nitrogen, the obtained polyethylene mixture was added to a biaxial extruder via a feeder in the nitrogen atmosphere. Further, 65 parts of liquid paraffin (P-350™ manufactured by MORESCO Corp.) were injected to the extruder through a side feeder, and the mixture was kneaded under a condition of 200° C. and extruded from a T-die installed at the end of the extruder. Then, the extrudate was immediately solidified by cooling with a cast roll cooled to 25° C. to form a gel-like sheet having a thickness of 1200 µm. This gel-like sheet was drawn 7×7-fold using a simultaneous biaxial drawing machine at 120° C. Then, this drawn film was dipped in methyl ethyl ketone for 30 minutes to extract and remove liquid paraffin, followed by drying. A microporous membrane was obtained by heat setting at 125° C. for 3 minutes. The physical properties of the obtained membrane were measured by the methods described above. The results are shown in Table 1.

(Puncture Strength Measurement)

The microporous membrane prepared by the method described above was subjected to a puncture test under conditions of a radius of curvature of 0.5 mm at the end of a needle and a puncture rate of 2 mm/sec using Kato Tech Co., Ltd. product "KES-G5 Handy Compression Tester"™ to measure a maximum puncture load (N). A maximum puncture load (N) of 3.5 N or more indicates sufficiently excellent strength. The evaluation criteria are as follows.

Evaluation Criteria
⊚: 4.0 N or more
○: less than 4.0 N and 3.5 N or more
Δ: less than 3.5 N and 3.0 N or more
x: less than 3.0 N (Evaluation of Defect)

A 50 µm or more defect (observed as a black point when the film was obtained in transmitted light) present in a 250 mm×250 mm sample of the microporous membrane prepared by the method described above was visually counted. The defect was evaluated on the basis of the obtained number according to the evaluation criteria given below. The evaluation criteria are as follows.

Evaluation Criteria
⊚: 0 or 1
○: 2 to 4
x: 5 or more

A 20 µm or more defect was also counted and evaluated in the same way as above. The evaluation criteria are as follows.

Evaluation Criteria
⊚: 0 to 10
○: 11 to 30
x: 31 or more (Evaluation of Slit Processing)

A 250 mm×250 mm sample of the microporous membrane prepared by the method described above was cut with a cutter to prepare 10 strips of the microporous membrane having a length of 250 mm. The cut ends of these strips were visually evaluated according to the evaluation criteria given below.

Evaluation Criteria
⊚: fluffing and/or undulation were hardly seen on the cut face.
○: fluffing and/or undulation were slightly seen on the cut face
x: fluffing and/or undulation were frequently seen on the cut face.

(Evaluation of Yellowish Color (Yellow Discoloration) (b Value))

The gel-like sheet obtained by film formation in a T-die film forming machine as described above was desolvated without being drawn. The b value of each sample thus obtained was measured using Tokyo Denshoku Co., Ltd. product "Spectro Photo Meter TOPSCAN TC-1800MKIII" to evaluate yellowish color (yellow discoloration). The evaluation criteria are as follows.

Evaluation Criteria
⊚: less than 2.0
○: 2.0 or more and less than 2.3
x: 2.3 or more (Evaluation of Bleedout (Matter Adhering to Roll))

The gel-like sheet obtained by film formation in a T-die film forming machine as described above was desolvated without being drawn. The sample thus obtained was heated at 50° C. for 72 hours and cooled at 23° C. for 1 hour to obtain a sample. The sample of 100 m was contacted with black felt cloth affixed to a fixation roll under conditions of a take-over speed of 8 m/min, and a component that bled out to the surface of the sample was accumulated on the felt cloth. The amount of the accumulated matter and the status of the accumulation were visually observed to evaluate the amount of bleedout as described below. The evaluation criteria are as follows.

Evaluation Criteria
⊚: no bleedout occurred, or the matter adhered slightly but partially.
○: the adhesion of bled-out matter was seen in a portion.
x: a lot of matter adhered.

Hereinafter, methods for producing the polyethylene powders used in Examples and Comparative Examples will be described.

[Preparation of Ziegler Catalyst I]

(1) Synthesis of Carrier A

An 8 L stainless autoclave thoroughly purged with nitrogen was charged with 1,000 mL of a hexane solution containing 2 mol/L hydroxytrichlorosilane. Subsequently, 2,550 mL (corresponding to 2.68 mol of magnesium) of a hexane solution of an organic magnesium compound represented by the compositional formula $AlMg_5(C_4H_9)_n(OC_4H_9)_2$ was added dropwise thereto over 10 hours with stirring at 65° C. The reaction was continued with stirring at 10° C. for 12 hours. After the completion of the reaction, the supernatant was removed, and the residue was washed with 1,800 mL of hexane four times to obtain a solid (carrier A). The obtained solid was dried, and fine powders were removed by separation using a sieve having an aperture size of 20 µm. As a result of analyzing the carrier A, the carrier A contained magnesium in an amount of 8.11 mmol per g and had an average particle size of 51 µm.

(2) Preparation of Solid Catalytic Component

To 1,970 mL of the hexane slurry containing 110 g of the carrier A, 110 mL of a hexane solution containing 1 mol/L titanium tetrachloride and 110 mL of a hexane solution containing 1 mol/L of an organic magnesium compound represented by the compositional formula $AlMg_5(C_4H_9)_{11}(OSiH)_2$ were added at the same time over 1 hour with stirring at 10° C. After the addition, the reaction was continued at 10° C. for 1 hour. After the completion of the reaction, 1,100 mL of the supernatant was removed, and the residue was washed with 1,100 mL of hexane twice to prepare Ziegler catalyst I. The Ziegler catalyst I contained titanium in an amount of 0.77 mmol per g.

[Preparation of Ziegler Catalyst II]

(1) Synthesis of Carrier B

An 8 L stainless autoclave thoroughly purged with nitrogen was charged with 1,000 mL of a hexane solution containing 2 mol/L hydroxytrichlorosilane. Subsequently, 2,550 mL (corresponding to 2.68 mol of magnesium) of a hexane solution of an organic magnesium compound represented by the compositional formula $AlMg_5(C_4H_9)_{11}(OC_4H_9)_2$ was added dropwise thereto over 0.5 hours with stirring at 65° C. The reaction was continued with stirring at 65° C. for 0.5 hours. After the completion of the reaction, the supernatant was removed, and the residue was washed with 1,800 mL of hexane four times to obtain a solid (carrier B). As a result of analyzing the carrier B, the carrier B contained magnesium in an amount of 8.67 mmol per g and had an average particle size of 3 μm.

(2) Preparation of Solid Catalytic Component

Ziegler catalyst II was prepared in the same way as the method for preparing Ziegler catalyst I except that 110 g of the carrier B was used instead of the carrier A. The Ziegler catalyst II contained titanium in an amount of 0.76 mmol per g.

[Preparation of Ziegler Catalyst III]

An 8 L stainless autoclave thoroughly purged with nitrogen was charged with 1,600 mL of hexane. 800 mL of a hexane solution containing 1 mol/L titanium tetrachloride and 800 mL of a hexane solution containing 1 mol/L of an organic magnesium compound represented by the compositional formula $AlMg_5(C_4H_9)_n(OSiH)_2$ were added thereto at the same time over 4 hours with stirring at 10° C. After the addition, the temperature was gradually raised, and the reaction was continued at 10° C. for 1 hour. After the completion of the reaction, 1600 mL of the supernatant was removed, and the residue was washed with 1,600 mL of hexane five times to prepare Ziegler catalyst III. This Ziegler catalyst III contained titanium in an amount of 2.93 mmol per g.

[Preparation of Ziegler Catalyst IV]

An 8 L stainless autoclave thoroughly purged with nitrogen was charged with 1,600 mL of hexane. 800 mL of a hexane solution containing 1 mol/L titanium tetrachloride and 800 mL of a hexane solution containing 1 mol/L of an organic magnesium compound represented by the compositional formula $AlMg_5(C_4H_9)_{11}(OSiH)_2$ were added thereto at the same time over 1 hours with stirring at 10° C. After the addition, the temperature was gradually raised, and the reaction was continued at 10° C. for 1 hour. After the completion of the reaction, 1,600 mL of the supernatant was removed, and the residue was washed with 1,600 mL of hexane three times to prepare Ziegler catalyst IV. This Ziegler catalyst IV contained titanium in an amount of 3.11 mmol per g.

(Preparation of Metallocene Catalyst)

Spherical silica having an average particle size of 15 μm, a surface area of 700 m²/g, and an intra-particle pore volume of 1.8 mL/g was calcined at 500° C. for 5 hours in the nitrogen atmosphere for dehydration to obtain dehydrated silica. The amount of surface hydroxy groups on the dehydrated silica was 1.85 mmol/g per $SiO_2$. In a 1.8 L autoclave, 40 g of the dehydrated silica was dispersed in 800 mL of hexane in the nitrogen atmosphere to obtain slurry. While the temperature of the obtained slurry was kept at 50° C. with stirring, 80 mL of a hexane solution of triethyl aluminum (concentration: 1 mol/L) was added thereto. The mixture was further stirred for 2 hours so that the triethyl aluminum was reacted with the surface hydroxy groups of the silica to obtain a component [a] containing triethyl aluminum-treated silica (in which the surface hydroxy groups of the triethyl aluminum-treated silica were capped by the triethyl aluminum) and a supernatant. Subsequently, the supernatant in the obtained reaction mixture was removed by decantation to remove unreacted triethyl aluminum in the supernatant. Subsequently, an appropriate amount of hexane was added to the residue to obtain 880 mL of hexane slurry of triethyl aluminum-treated silica.

Meanwhile, [(N-t-butylamido) (tetramethyl-η5-cyclopentadienyl)dimethylsilane]titanium-1,3-pentadiene (hereinafter, also referred to as a "titanium complex") was dissolved at 200 mmol in 1000 mL of Isopar E (trade name of hydrocarbon mixture manufactured by Exxon Chemical Co., Inc. (US)). To this solution, 20 mL of a hexane solution containing 1 mol/L compound of the formula $AlMg_6(C_2H_5)_3(n-C_4H_9)_y$, synthesized in advance from triethyl aluminum and dibutyl magnesium was added, and hexane was further added to obtain a component [b] having a titanium complex concentration of 0.1 mol/L.

5.7 g of bis(hydrogenated tallow alkyl)methylammonium-tris(pentafluorophenyl) (4-hydroxyphenyl) borate (hereinafter, also referred to as a "borate") was added to 50 mL of toluene and dissolved therein to obtain a toluene solution containing 100 mmol/L borate. To the toluene solution of the borate, 5 mL of a hexane solution containing 1 mol/L ethoxydiethyl aluminum was added at room temperature. The borate concentration in the solution was adjusted to 70 mmol/L by the addition of hexane. Then, the mixture was stirred at room temperature for 1 hour to obtain a reaction mixture containing the borate. To 800 mL of the slurry of the component [a] obtained as described above, 46 mL of the reaction mixture containing the borate was added with stirring at 15 to 20° C. to allow the borate to be supported by the silica. In this way, slurry of the borate-supported silica was obtained. To the obtained slurry, 32 mL of the component [b] was added, and the mixture was stirred for 3 hours so that the titanium complex was reacted with the borate to obtain a supported metallocene catalyst containing silica with a catalytic active species formed thereon, and a supernatant.

Example 1

(Polymerization for and Preparation of Polyethylene Powder A-1)

Batch polymerization was carried out under polymerization conditions of a polymerization temperature of 75° C., a polymerization pressure of 0.8 MPa, and a reaction time of 1.0 hours using a vessel-type 340 L polymerization reactor equipped with a stirring apparatus with a vertical stirring blade and equipped with no baffle plate. The solvent used was dehydrated n-hexane. The starting material used was 11 kg of ethylene. The catalyst used was 1.5 mmol (in terms of Ti atom) of a metallocene catalyst and 20 mmol of triisobutyl aluminum. The feed position of ethylene was disposed near the bottom of the polymerization reactor. The catalyst was fed from three locations, two of which were near the surface of the solution, and the remaining one of which was adjacent to the ethylene feed position disposed near the bottom. For molecular weight adjustment, hydrogen was introduced to the polymerization reactor such that the amount of the hydrogen was 0.075 mol % with respect to the total vapor-phase concentration of ethylene and 1-butene. A comonomer 1-butene was introduced thereto for last 10 minutes of polymerization such that the amount of the comonomer was 5 mol % with respect to the vapor-phase concentration of ethylene. The catalytic activity was $7.9 \times 10^4$ g-PE/g-metallocene catalyst.

After the polymerization, the polymer slurry in the polymerization reactor was led to a flash tank having a pressure of 0.05 MPa and a temperature of 90° C. and stirred for 30 minutes. Then, the temperature was adjusted to 70° C. to separate unreacted ethylene, 1-butene, and hydrogen. Subsequently, the polymer slurry led to the flash tank was led to a buffer tank having a pressure of 0.30 MPa and a temperature of 70° C. and left standing for 1 hour. Subsequently, the polymer was separated from non-polymer residues (e.g., the solvent) using centrifugation. The polymer thus obtained by separation was dried while nitrogen was blown at 85° C. Fine powders and coarse powders were further removed using sieves having an aperture size of 53 µm and an aperture size of 300 µm to obtain polyethylene powder A-1. The polyethylene powder A-1 had a weight-average molecular weight ($M_w$) of $2.51 \times 10^5$. $M_1$, $M_2$, $M_3$, $M_1/M_2$, and $M_3/M_2$ in the expression 1 are shown in Table 1 below.

(Polymerization for and Preparation of Polyethylene Powder A-2)

Polyethylene powder A-2 was obtained in the same way as in the polyethylene powder A-1 except that: the comonomer 1-butene was introduced at 0.32 mol % with respect to the vapor-phase concentration of ethylene to the polymerization reactor; and the amount of the hydrogen was 0.152 mol % with respect to the total vapor-phase concentration of ethylene and 1-butene. The catalytic activity was $9.0 \times 10^4$ g-PE/g-metallocene catalyst. The polyethylene powder A-2 had a weight-average molecular weight ($M_w$) of $1.16 \times 10^5$. $M_1$, $M_2$, $M_3$, $M_1/M_2$, and $M_3/M_2$ in the expression 1 are shown in Table 1 below.

(Preparation of Polyethylene Powder B-1)

The polyethylene powder A-1 and the polyethylene powder A-2 were mixed at a ratio of 50:50. Calcium stearate was added thereto at 600 ppm, and the mixture was well mixed to obtain polyethylene powder B-1. Results of evaluating the polyethylene powder B-1 are shown in Table 2.

A microporous membrane was prepared by the method described above using the polyethylene powder B-1. CFC measurement was carried out as to the membrane, and results similar to those about the polyethylene powder B-1 were obtained.

Example 2

(Polymerization for and Preparation of Polyethylene Powder A-3)

Hexane, ethylene, hydrogen, and a catalyst were continuously supplied to a vessel-type 300 L polymerization reactor equipped with a stirring apparatus with a vertical stirring blade and equipped with no baffle plate. The polymerization pressure was 0.5 MPa, and the polymerization temperature was 80° C. The hexane was supplied at a rate of 40 L/hr to near the bottom of the polymerization reactor. The catalyst used was the Ziegler catalyst I, and the promoter used was triisobutyl aluminum. The Ziegler catalyst I and the triisobutyl aluminum were added at rates of 0.2 g/hr and 10 mmol/hr, respectively, to the polymerization reactor. The catalyst was fed from three locations, two of which were near the surface of the solution, and the remaining one of which was adjacent to the ethylene feed position disposed near the bottom. The production rate of the resulting ethylene polymer was 10 kg/hr. The hydrogen was continuously supplied to the polymerization reactor using a pump such that the amount of the hydrogen was 10 mol % with respect to the vapor-phase concentration of ethylene. The catalytic activity was 80,000 g-PE/g-Ziegler catalyst I. While the level of the polymerization reactor was kept constant, the polymer slurry was continuously led to a flash drum having a pressure of 0.05 MPa and a temperature of 90° C., and stirred for 30 minutes. Then, the temperature was lowered to 70° C. to separate unreacted ethylene and hydrogen. Subsequently, while the level of the polymerization reactor was kept constant, the polymer slurry was continuously sent to a centrifuge to separate the polymer from non-polymer residues (e.g., the solvent). The polymer thus obtained by separation was dried while nitrogen was blown at 85° C. During the drying, steam was sprayed to the polymer to inactivate the catalyst and the promoter. In order to remove magnesium chloride in the inside of the obtained polymer, the obtained polymer was added to pure water, and the mixture was stirred for 2 hours and dried. To the obtained polymer, 600 ppm of calcium stearate (manufactured by Dainichi Chemical Industry Co., Ltd., C60) was added, and the mixture was uniformly mixed using Henschel mixer. Fine powders and coarse powders were removed from the obtained polymer using sieves having an aperture size of 53 µm and an aperture size of 300 µm to obtain polyethylene powder A-3. The polyethylene powder A-3 had $M_w$ of $4.24 \times 10^5$. $M_1$, $M_2$, $M_3$, $M_1/M_2$, and $M_3/M_2$ in the expression 1 are shown in Table 1 below.

(Polymerization for and Preparation of Polyethylene Powder A-4)

Polymerization and removal of magnesium chloride were carried out by the same approach as in the polyethylene powder A-3 except that: the polymerization temperature was 70° C.; the comonomer 1-butene was introduced at 10.3 mol % with respect to the vapor-phase concentration of ethylene to the polymerization reactor; and the amount of the hydrogen was 17 mol % with respect to the total vapor-phase concentration of ethylene and 1-butene. The catalytic activity was $1.0 \times 10^5$ g-PE/g-Ziegler catalyst I. Fine powders and coarse powders were removed from the obtained polymer using sieves having an aperture size of 53 µm and an aperture size of 300 µm to obtain polyethylene powder A-4. The polyethylene powder A-4 had $M_w$ of $9.89 \times 10^4$. $M_1$, $M_2$, $M_3$, $M_1/M_2$, and $M_3/M_2$ in the expression 1 are shown in Table 1 below.

(Preparation of Polyethylene Powder B-2)

The polyethylene powder A-3 and the polyethylene powder A-4 were mixed at a ratio of 50:50. Calcium stearate was added thereto at 600 ppm, and the mixture was well mixed to obtain polyethylene powder B-2. Results of evaluating the polyethylene powder B-2 are shown in Table 2.

Comparative Example 1

(Preparation of Polyethylene Powder B-12)

The polyethylene powder A-2 and the polyethylene powder A-4 were mixed at a ratio of 50:50. Calcium stearate was added thereto at 600 ppm, and the mixture was well mixed to obtain polyethylene powder B-12. Results of evaluating the polyethylene powder B-12 are shown in Table 2.

37

Comparative Example 2

(Preparation of Polyethylene Powder B-7)

The polyethylene powder A-1 and the polyethylene powder A-2 were mixed at a ratio of 20:80. Calcium stearate was added thereto at 600 ppm, and the mixture was well mixed to obtain polyethylene powder B-7. Results of evaluating the polyethylene powder B-7 are shown in Table 2.

Example 3

(Polymerization for and Preparation of Polyethylene Powder A-6)

Polyethylene having a molecular weight equivalent to that of the polyethylene powder A-3 was obtained with low polymerization activity by the same approach of polymerization and removal of magnesium chloride as in the polyethylene powder A-3 except that: all the pressures were 0.23 MPa; and the amount of the hydrogen was 9.7 mol % with respect to the vapor-phase concentration of ethylene. The catalytic activity was $3.3 \times 10^4$ g-PE/g-Ziegler catalyst I. Fine powders and coarse powders were removed from the obtained polymer using sieves having an aperture size of 53 µm and an aperture size of 300 µm to obtain polyethylene powder A-6. The polyethylene powder A-6 had $M_w$ of $3.95 \times 10^5$. $M_1$, $M_2$, $M_3$, $M_1/M_2$, and $M_3/M_2$ in the expression 1 are shown in Table 1 below.

(Polymerization and Preparation of Polyethylene Powder A-7)

Polyethylene having a molecular weight equivalent to that of the polyethylene powder A-5 was obtained with low polymerization activity by the same approach of polymerization and removal of magnesium chloride as in the polyethylene powder A-3 except that: all the pressures were 0.21 MPa; the comonomer 1-butene was introduced at 10.5 mol % with respect to the vapor-phase concentration of ethylene to the polymerization reactor; and the amount of the hydrogen was 16.1 mol % with respect to the total vapor-phase concentration of ethylene and 1-butene. The catalytic activity was $3.4 \times 10^4$ g-PE/g-Ziegler catalyst I. Fine powders and coarse powders were removed from the obtained polymer using sieves having an aperture size of 53 µm and an aperture size of 300 µm to obtain polyethylene powder A-7. The polyethylene powder A-7 had $M_w$ of $8.68 \times 10^4$. $M_1$, $M_2$, $M_3$, $M_1/M_2$, and $M_3/M_2$ in the expression 1 are shown in Table 1 below.

(Preparation of Polyethylene Powder B-5)

The polyethylene powder A-6 and the polyethylene powder A-7 were mixed at a ratio of 50:50. Calcium stearate was added thereto at 600 ppm, and the mixture was well mixed to obtain polyethylene powder B-5. Results of evaluating the polyethylene powder B-5 are shown in Table 2.

Example 4

(Preparation of Polyethylene Powder B-6)

The polyethylene powder A-3 and the polyethylene powder A-4 were mixed at a ratio of 50:50. Calcium stearate was added thereto at 6000 ppm, and the mixture was well mixed to obtain polyethylene powder B-6. Results of evaluating the polyethylene powder B-6 are shown in Table 2.

38

Example 5

(Polymerization for and Preparation of Polyethylene Powder A-14)

Polymerization and removal of magnesium chloride were carried out by the same approach as in the polyethylene powder A-3 except that the amount of the hydrogen was 7.4 mol % with respect to the vapor-phase concentration of ethylene. The catalytic activity was $9.0 \times 10^4$ g-PE/g-Ziegler catalyst I. Fine powders and coarse powders were removed from the obtained polymer using sieves having an aperture size of 53 µm and an aperture size of 300 µm to obtain polyethylene powder A-14. The polyethylene powder A-14 had $M_w$ of $8.16 \times 10^5$. $M_1$, $M_2$, $M_3$, $M_1/M_2$, and $M_3/M_2$ in the expression 1 are shown in Table 1 below.

(Preparation of Polyethylene Powder B-13)

The polyethylene powder A-4 and the polyethylene powder A-14 were mixed at a ratio of 60:40. Calcium stearate was added thereto at 600 ppm, and the mixture was well mixed to obtain polyethylene powder B-13. Results of evaluating the polyethylene powder B-13 are shown in Table 2.

Example 6

(Polymerization for and Preparation of Polyethylene Powder A-8)

Polymerization was carried out by the same approach as in the polyethylene powder A-2 except that: the temperature of the flash drum was 70° C. from the beginning; and the 30-minute stirring was not carried out. The catalytic activity was $8.6 \times 10^4$ g-PE/g-metallocene catalyst. The polyethylene powder A-8 had a weight-average molecular weight ($M_w$) of $1.20 \times 10^5$. $M_1$, $M_2$, $M_3$, $M_1/M_2$, and $M_3/M_2$ in the expression 1 are shown in Table 1 below.

(Polymerization for and Preparation of Polyethylene Powder A-9)

Polymerization and removal of magnesium chloride were carried out by the same approach as in the polyethylene powder A-4 except that: the temperature of the flash drum was 70° C. from the beginning; and the 30-minute stirring was not carried out. The catalytic activity was $1.0 \times 10^5$ g-PE/g-Ziegler catalyst I. Fine powders and coarse powders were removed from the obtained polymer using sieves having an aperture size of 53 µm and an aperture size of 300 µm to obtain polyethylene powder A-9. The polyethylene powder A-9 had $M_w$ of $1.04 \times 10^5$. $M_1$, $M_2$, $M_3$, $M_1/M_2$, and $M_3/M_2$ in the expression 1 are shown in Table 1 below.

(Polymerization for and Preparation of Polyethylene Powder A-22)

Polymerization and removal of magnesium chloride were carried out by the same approach as in the polyethylene powder A-3 except that: the temperature of the flash drum was 70° C. from the beginning; the 30-minute stirring was not carried out; and the amount of the hydrogen was 5.6 mol % with respect to the vapor-phase concentration of ethylene. The catalytic activity was $8.1 \times 10^4$ g-PE/g-Ziegler catalyst I. Fine powders and coarse powders were removed from the obtained polymer using sieves having an aperture size of 53 µm and an aperture size of 300 µm to obtain polyethylene powder A-22. The polyethylene powder A-22 had $M_w$ of $1.11 \times 10^6$. $M_1$, $M_2$, $M_3$, $M_1/M_2$, and $M_3/M_2$ in the expression 1 are shown in Table 1 below.

(Preparation of Polyethylene Powder B-4)

The polyethylene powder A-8, the polyethylene powder A-9, and the polyethylene powder A-22 were mixed at a ratio of 50:20:30. Calcium stearate was added thereto at 600 ppm, and the mixture was well mixed to obtain polyethylene powder B-4. Results of evaluating the polyethylene powder B-4 are shown in Table 2.

Example 7

(Polymerization for and Preparation of Polyethylene Powder A-10)

Polymerization was carried out by the same approach as in the polyethylene powder A-1 except that the polymerization was carried out without introducing any comonomer during the polymerization. The catalytic activity was $8.0 \times 10^4$ g-PE/g-Ziegler catalyst I. Fine powders and coarse powders were removed from the obtained polyethylene powder using sieves having an aperture size of 53 µm and an aperture size of 300 µm to obtain polyethylene powder A-10. The polyethylene powder A-10 had $M_w$ of $2.37 \times 10^5$. $M_1$, $M_2$, $M_3$, $M_1/M_2$, and $M_3/M_2$ in the expression 1 are shown in Table 1 below.

(Polymerization for and Preparation of Polyethylene Powder A-11)

Polymerization was carried out by the same approach as in the polyethylene powder A-2 except that the amount of the comonomer was fixed to 0.32 mol % to the end of the polymerization. The catalytic activity was $9.0 \times 10^4$ g-PE/g-Ziegler catalyst I. Fine powders and coarse powders were removed from the obtained polyethylene powder using sieves having an aperture size of 53 µm and an aperture size of 300 µm to obtain polyethylene powder A-11. The polyethylene powder A-11 had $M_w$ of $1.41 \times 10^5$. $M_1$, $M_2$, $M_3$, $M_1/M_2$, and $M_3/M_2$ in the expression 1 are shown in Table 1 below.

(Preparation of Polyethylene Powder B-10)

The polyethylene powder A-10 and the polyethylene powder A-11 were mixed at a ratio of 50:50. Calcium stearate was added thereto at 600 ppm, and the mixture was well mixed to obtain polyethylene powder B-10. Results of evaluating the polyethylene powder B-10 are shown in Table 2.

Example 8

(Polymerization for and Preparation of Polyethylene Powder A-12)

Polymerization and removal of magnesium chloride were carried out by the same approach as in the polyethylene powder A-3 except that the catalyst was the Ziegler catalyst II. The catalytic activity was $8.0 \times 10^4$ g-PE/g-Ziegler catalyst II. Fine powders and coarse powders were removed from the obtained polyethylene powder using sieves having an aperture size of 53 µm and an aperture size of 300 µm to obtain polyethylene powder A-12. The polyethylene powder A-12 had $M_w$ of $4.02 \times 10^5$. $M_1$, $M_2$, $M_3$, $M_1/M_2$, and $M_3/M_2$ in the expression 1 are shown in Table 1 below.

(Polymerization for and Preparation of Polyethylene Powder A-13)

Polymerization and removal of magnesium chloride were carried out by the same approach as in the polyethylene powder A-4 except that the catalyst was the Ziegler catalyst II. The catalytic activity was $1.0 \times 10^5$ g-PE/g-Ziegler catalyst II. Fine powders and coarse powders were removed from the obtained polyethylene powder using sieves having an aperture size of 53 µm and an aperture size of 300 µm to obtain polyethylene powder A-13. The polyethylene powder A-13 had $M_w$ of $1.04 \times 10^6$. $M_1$, $M_2$, $M_3$, $M_1/M_2$, and $M_3/M_2$ in the expression 1 are shown in Table 1 below.

(Preparation of Polyethylene Powder B-11)

The polyethylene powder A-12 and the polyethylene powder A-13 were mixed at a ratio of 50:50. Calcium stearate was added thereto at 600 ppm, and the mixture was well mixed to obtain polyethylene powder B-11. Results of evaluating the polyethylene powder B-11 are shown in Table 2.

Example 9

(Polymerization for and Preparation of Polyethylene Powder A-15)

Polymerization and removal of magnesium chloride were carried out by the same approach as in the polyethylene powder A-3 except that: the comonomer 1-butene was introduced at 2.4 mol % with respect to the vapor-phase concentration of ethylene to the polymerization reactor; and the amount of the hydrogen was 7.4 mol % with respect to the total vapor-phase concentration of ethylene and 1-butene. The catalytic activity was $8.7 \times 10^4$ g-PE/g-Ziegler catalyst I. Fine powders and coarse powders were removed from the obtained polymer using sieves having an aperture size of 53 µm and an aperture size of 300 µm to obtain polyethylene powder A-4. The polyethylene powder A-4 had $M_w$ of $7.57 \times 10^5$. $M_1$, $M_2$, $M_3$, $M_1/M_2$, and $M_3/M_2$ in the expression 1 are shown in Table 1 below.

(Preparation of Polyethylene Powder B-16)

The polyethylene powder A-4 and the polyethylene powder A-15 were mixed at a ratio of 50:50. Calcium stearate was added thereto at 600 ppm, and the mixture was well mixed to obtain polyethylene powder B-16. Results of evaluating the polyethylene powder B-16 are shown in Table 2.

Example 10

(Polymerization for and Preparation of Polyethylene Powder A-5)

Polymerization and removal of magnesium chloride were carried out by the same approach as in the polyethylene powder A-3 except that the amount of the hydrogen was 5.6 mol % with respect to the vapor-phase concentration of ethylene. The catalytic activity was $8.2 \times 10^4$ g-PE/g-Ziegler catalyst I. Fine powders and coarse powders were removed from the obtained polymer using sieves having an aperture size of 53 µm and an aperture size of 300 µm to obtain polyethylene powder A-5. The polyethylene powder A-5 had $M_w$ of $1.12 \times 10^6$. $M_1$, $M_2$, $M_3$, $M_1/M_2$, and $M_3/M_2$ in the expression 1 are shown in Table 1 below.

(Polymerization for and Preparation of Polyethylene Powder A-16)

Polyethylene powder A-16 was obtained in the same way as in the polyethylene powder A-1 except that: the comonomer 1-butene was introduced at 0.10 mol % with respect to the vapor-phase concentration of ethylene to the polymerization reactor; and the amount of the hydrogen was 0.047 mol % with respect to the total vapor-phase concentration of ethylene and 1-butene. The catalytic activity was $8.5 \times 10^4$ g-PE/g-metallocene catalyst. The polyethylene powder A-16 had a weight-average molecular weight ($M_w$) of $3.02 \times 10^5$. $M_1$, $M_2$, $M_3$, $M_1/M_2$, and $M_3/M_2$ in the expression 1 are shown in Table 1 below.

(Preparation of Polyethylene Powder B-17)

The polyethylene powder A-16, the polyethylene powder A-4 and the polyethylene powder A-5 were mixed at a ratio of 50:20:30. Calcium stearate was added thereto at 600 ppm, and the mixture was well mixed to obtain polyethylene powder B-17. Results of evaluating the polyethylene powder B-17 are shown in Table 2.

Example 11

(Preparation of Polyethylene Powder B-15)

The polyethylene powder A-3 and the polyethylene powder A-14 were mixed at a ratio of 50:50. Calcium stearate was added thereto at 600 ppm, and the mixture was well mixed to obtain polyethylene powder B-15. Results of evaluating the polyethylene powder B-15 are shown in Table 2.

Example 12

(Polymerization for and Preparation of Polyethylene Powder A-18)

Polyethylene powder A-18 was obtained in the same way as in the polyethylene powder A-1 except that the removal of coarse powders through a sieve having an aperture size of 300 μm was not carried out. The catalytic activity was $8.0 \times 10^4$ g-PE/g-metallocene catalyst. The polyethylene powder A-18 had a weight-average molecular weight ($M_w$) of $2.62 \times 10^5$. $M_1$, $M_2$, $M_3$, $M_1/M_2$ and $M_3/M_2$ in the expression 1 are shown in Table 1 below.

(Polymerization for and Preparation of Polyethylene Powder A-19)

Polyethylene powder A-19 was obtained in the same way as in the polyethylene powder A-2 except that the removal of coarse powders through a sieve having an aperture size of 300 μm was not carried out. The catalytic activity was $8.2 \times 10^4$ g-PE/g-metallocene catalyst. The polyethylene powder A-19 had a weight-average molecular weight ($M_w$) of $1.23 \times 10^5$. $M_1$, $M_2$, $M_3$, $M_1/M_2$, and $M_3/M_2$ in the expression 1 are shown in Table 1 below.

(Preparation of Polyethylene Powder B-19)

The polyethylene powder A-18 and the polyethylene powder A-19 were mixed at a ratio of 50:50. Calcium stearate was added thereto at 600 ppm, and the mixture was well mixed to obtain polyethylene powder B-19. Results of evaluating the polyethylene powder B-19 are shown in Table 2.

Comparative Example 3

(Polymerization for and Preparation of Polyethylene Powder A-17)

Hexane, ethylene, hydrogen, and a catalyst were continuously supplied to a vessel-type 300 L polymerization reactor equipped with a stirring apparatus. The polymerization pressure was 0.5 MPa. The polymerization temperature was kept at 83° C. by jacket cooling. The hexane was supplied at a rate of 40 L/hr from the bottom of the polymerization reactor. The Ziegler catalyst III and a promoter triisobutyl aluminum were used. The Ziegler catalyst III was added at a rate of 0.2 g/hr from the intermediate portion between the surface of the solution in the polymerization reactor and the bottom of the polymerization reactor, and the triisobutyl aluminum was added at a rate of 10 mmol/hr from the intermediate portion between the surface of the solution in the polymerization reactor and the bottom of the polymerization reactor. The production rate of the ethylene polymer was 10 kg/hr. The hydrogen was continuously supplied thereto using a pump such that the hydrogen concentration was 14 mol % with respect to the ethylene concentration in the vapor phase. The hydrogen was supplied from a catalyst inlet line in advance for contact with the catalyst, and the ethylene was supplied from the bottom of the polymerization reactor. The catalytic activity was 80,000 g-PE/g-Ziegler catalyst III. While the level of the polymerization reactor was kept constant, the polymer slurry was continuously discharged to a flash drum having a pressure of 0.05 MPa and a temperature of 70° C. to separate unreacted ethylene and hydrogen. While the level of the polymerization reactor was kept constant, the polymer slurry was continuously sent to a centrifuge to separate the polymer from the other components such as the solvent. The ethylene polymer powder thus obtained by separation was dried while nitrogen was blown at 85° C. In this drying step, steam was sprayed to the powder after the polymerization to inactivate the catalyst and the promoter. To the obtained ethylene polymer powder, 1,500 ppm of calcium stearate (manufactured by Dainichi Chemical Industry Co., Ltd., C60) was added, and the mixture was uniformly mixed using Henschel mixer. Fine powders and coarse powders were removed from the obtained polymer using sieves having an aperture size of 53 μm and an aperture size of 300 μm to obtain polyethylene powder A-17. The polyethylene powder A-17 had $M_w$ of $2.45 \times 10^5$. $M_1$, $M_2$, $M_3$, $M_1/M_2$, and $M_3/M_2$ in the expression 1 are shown in Table 1 below.

(Preparation of Polyethylene Powder B-18)

To the polyethylene powder A-17, 600 ppm of calcium stearate was added, and the mixture was well mixed to obtain polyethylene powder B-18. Results of evaluating the polyethylene powder B-18 are shown in Table 2.

Example 13

(Polymerization for and Preparation of Polyethylene Powder A-20)

Ethylene and hydrogen (12 to 18 mol % per 100 mol % in total of ethylene and hydrogen) were supplied to a vessel-type 300 L polymerization reactor (containing the whole amount (14 L) of hexane) equipped with a stirring apparatus while the hydrogen concentration was intermittently changed to adjust the polymerization pressure to 0.5 MPa. A promoter triisobutyl aluminum was added thereto at 0.025 mmol. Then, 0.02 g of the Ziegler catalyst IV was added thereto to start polymerization reaction. During the polymerization reaction, ethylene was also fed thereto at a constant rate of 0.5 L/min. The polymerization temperature was kept at from 82° C. (polymerization initiation temperature) to 85° C. (peak temperature) by jacket cooling and condenser cooling. After a lapse of 3 hours, the polymerization temperature was lowered to 60° C., and the reactor was depressurized to remove unreacted ethylene and hydrogen. The polymerization system was purged with nitrogen. Then, the polymer slurry was poured to methanol to completely terminate the polymerization reaction. The slurry concentration was 10.0% by mass. The catalytic activity was 50,000 g-PE/g-Ziegler catalyst IV. Subsequently, the polymer slurry was sent to a filtration vessel equipped with a filter to separate the polymer from the solvent. Then, the polymer was dried by heating at 85° C. for 12 hours in a hot-air dryer. To the obtained polymer, 600 ppm of calcium stearate (manufactured by Dainichi Chemical Industry Co., Ltd., C60) was added, and the mixture was uniformly mixed using Henschel mixer. Fine powders and coarse powders were removed from the obtained polymer using sieves having an aperture size of 53 μm and an aperture size of 300 μm to obtain polyethylene powder A-20. The polyethylene powder A-20 had $M_w$ of $4.47 \times 10^5$. $M_1$, $M_2$, $M_3$, $M_1/M_2$, and $M_3/M_2$ in the expression 1 are shown in Table 1 below.

(Preparation of Polyethylene Powder B-20)

To the polyethylene powder A-20, 600 ppm of calcium stearate was added, and the mixture was well mixed to obtain polyethylene powder B-20. Results of evaluating the polyethylene powder B-20 are shown in Table 2.

Example 14

(Polymerization for and Preparation of Polyethylene Powder A-21)

Polymerization and removal of magnesium chloride were carried out by the same approach as in the polyethylene powder A-3 except that the amount of the hydrogen was 11.0 mol % with respect to the total vapor-phase concentration of ethylene and 1-butene. The catalytic activity was $8.2 \times 10^4$ g-PE/g-Ziegler catalyst I. Fine powders and coarse powders were removed from the obtained polymer using sieves having an aperture size of 53 μm and an aperture size of 300 μm to obtain polyethylene powder A-21. The polyethylene powder A-21 had $M_w$ of $3.51 \times 10^5$. $M_1$, $M_2$, $M_3$, $M_1/M_2$, and $M_3/M_2$ in the expression 1 are shown in Table 1 below.

(Preparation of Polyethylene Powder B-21)

To the polyethylene powder A-21, 600 ppm of calcium stearate was added, and the mixture was well mixed to obtain polyethylene powder B-21. Results of evaluating the polyethylene powder B-21 are shown in Table 2.

Comparative Example 4

(Preparation of Polyethylene Powder B-14)

The polyethylene powder A-2, the polyethylene powder A-4, and the polyethylene powder A-14 were mixed at a ratio of 50:10:40. Calcium stearate was added thereto at 600 ppm, and the mixture was well mixed to obtain polyethylene powder B-14. Results of evaluating the polyethylene powder B-14 are shown in Table 2.

TABLE 1

|  | A-1 | A-2 | A-3 | A-4 | A-5 | A-6 | A-7 | A-8 | A-9 | A-10 | A-11 | A-12 | A-13 |
|---|---|---|---|---|---|---|---|---|---|---|---|---|---|
| $M_1$ ($10^5$) | 2.42 | 1.17 | 4.34 | 0.92 | 11.10 | 4.28 | 0.82 | 1.25 | 1.01 | 2.14 | 1.42 | 3.83 | 11.20 |
| $M_2$ ($10^5$) | 2.51 | 1.16 | 4.24 | 0.99 | 11.20 | 3.95 | 0.87 | 1.20 | 1.04 | 2.37 | 1.41 | 4.02 | 10.36 |
| $M_3$ ($10^5$) | 2.68 | 1.19 | 4.39 | 1.04 | 11.22 | 4.10 | 1.00 | 1.22 | 0.99 | 2.60 | 1.52 | 4.24 | 9.80 |
| $M_1/M_2$ (—) | 0.96 | 1.01 | 1.02 | 0.93 | 0.99 | 1.08 | 0.94 | 1.04 | 0.97 | 0.90 | 1.01 | 0.95 | 1.08 |
| $M_3/M_2$ (—) | 1.07 | 1.03 | 1.04 | 1.05 | 1.00 | 1.04 | 1.15 | 1.02 | 0.95 | 1.10 | 1.08 | 1.05 | 0.95 |

|  | A-14 | A-15 | A-16 | A-17 | A-18 | A-19 | A-20 | A-21 | A-22 |
|---|---|---|---|---|---|---|---|---|---|
| $M_1$ ($10^5$) | 8.32 | 7.55 | 2.95 | 2.39 | 2.55 | 1.31 | 4.62 | 3.44 | 11.00 |
| $M_2$ ($10^5$) | 8.16 | 7.57 | 3.02 | 2.45 | 2.62 | 1.23 | 4.47 | 3.51 | 11.10 |
| $M_3$ ($10^5$) | 8.31 | 7.52 | 3.03 | 2.36 | 2.66 | 1.33 | 4.42 | 3.46 | 11.20 |
| $M_1/M_2$ (—) | 1.02 | 1.00 | 0.98 | 0.98 | 0.97 | 1.07 | 1.03 | 0.98 | 0.99 |
| $M_3/M_2$ (—) | 1.02 | 0.99 | 1.00 | 0.96 | 1.02 | 1.08 | 0.99 | 0.99 | 1.01 |

TABLE 2

|  |  | Example 1 B-1 | Example 2 B-2 | Example 3 B-5 | Example 4 B-6 | Example 5 B-13 | Example 6 B-4 | Example 7 B-10 |
|---|---|---|---|---|---|---|---|---|
| CFC | Cumulative percentage elution from 50° C. to 98° C. | 56.0 | 57.4 | 58.1 | 56.9 | 70.0 | 74.2 | 55.1 |
|  | Having component having Mw of 200,000 or more at 85° C. or more and less than 105° C. | ○ | ○ | ○ | ○ | ○ | ○ | ○ |
| Percentage of particle having particle size of 300 μm or more (wt %) |  | 0.0 | 0.0 | 0.0 | 0.0 | 0.0 | 0.0 | 0.0 |
| Chlorine content (ppm) |  | 7 | 31 | 71 | 34 | 21 | 18 | 6 |
| Lubricant content (ppm) |  | 616 | 610 | 581 | 6320 | 570 | 607 | 587 |
| CFC | Cumulative percentage elution at 50° C. or more and less than 94° C. (%) | 30.6 | 19.0 | 19.2 | 18.5 | 31.0 | 48.8 | 29.4 |
|  | The number of peaks | 3 | 3 | 3 | 3 | 3 | 3 | 3 |
| Satisfaction of expression 1 |  | ○ | ○ | ○ | ○ | ○ | ○ | ○ |
| Torque | Difference in temperature between peaks (° C.) | ○ 17.4 | ○ 19.7 | ○ 20.2 | ○ 20.8 | ○ 23 | X 27.2 | X |
| Puncture strength (N) |  | ○ 3.7 | ○ 3.8 | ◎ 4 | ◎ 4.1 | ○ 3.7 | Δ 3.4 | ○ |
| Melting point (° C.) |  | ◎ 130.1 | ○ 133.2 | ○ 133.7 | ○ 133.1 | ○ 132.7 | ◎ 131.28 | ◎ |
| MFR (g/10 min) |  | ◎ >20 | ◎ >20 | ◎ >20 | ◎ >20 | ○ 11 | ○ 88 | ◎ |
| Slit processability |  | ○ | ◎ | ◎ | ◎ | ○ | ○ | ○ |
| Count of 50 μ or more defect (number) |  | ◎ | ◎ | ○ | ○ | ○ | X | X |

TABLE 2-continued

| | | Example 7 B-10 | | Example 8 B-11 | | Example 9 B-16 | | Example 10 B-17 | | Example 11 B-15 | | Example 12 B-19 | | Example 13 B-20 |
|---|---|---|---|---|---|---|---|---|---|---|---|---|---|---|
| Count of 20 μ or more defect (number) | | ◎ | | ○ | | ○ | | ○ | | ○ | | ○ | | ○ |
| b value | | ◎ | | ◎ | | X | | ◎ | | ◎ | | ◎ | | ◎ |
| Bleedout | | ◎ | | ○ | | ○ | | X | | ○ | | ○ | | ◎ |
| CFC | Cumulative percentage elution from 50° C. to 98° C. | | | 57.0 | | 77.2 | | 54.3 | | 56.0 | | 55.1 | | 53.5 |
| | Having component having Mw of 200,000 or more at 85° C. or more and less than 105° C. | | | ○ | | ○ | | ○ | | ○ | | ○ | | ○ |
| Percentage of particle having particle size of 300 μm or more (wt %) | | | | 0.0 | | 0.0 | | 0.0 | | 0.0 | | 2.0 | | 0.0 |
| Chlorine content (ppm) | | | | 38 | | 21 | | 17 | | 13 | | 9 | | 19 |
| Lubricant content (ppm) | | | | 631 | | 630 | | 589 | | 602 | | 608 | | 614 |
| CFC | Cumulative percentage elution at 50° C. or more and less than 94° C. (%) | | | 18.1 | | 35.2 | | 18.3 | | 11.2 | | 31.2 | | 6.0 |
| | The number of peaks | | | 3 | | 2 | | 3 | | 2 | | 3 | | 2 |
| Satisfaction of expression 1 | | | | ○ | | ○ | | ○ | | ○ | | ○ | | ○ |
| Torque | Difference in temperature between peaks (° C.) | 31.8 | X | 28.8 | ○ | 21.3 | X | 29.8 | ○ | 22 | ○ | 17 | ○ | 5 |
| Puncture strength (N) | | 3.6 | ○ | 3.9 | Δ | 3.4 | ○ | 3.8 | Δ | 3.1 | ○ | 3.7 | Δ | 3.3 |
| Melting point (° C.) | | 130.5 | ○ | 133.8 | ○ | 132.3 | ○ | 133 | ○ | 132.4 | ◎ | 130.1 | ○ | 135 |
| MFR (g/10 min) | | >20 | ◎ | >20 | ○ | 7 | ○ | 38 | ○ | 2 | ◎ | >20 | ○ | 11 |
| Slit processability | | | | ○ | | ○ | | ○ | | ○ | | ○ | | ○ |
| Count of 50 μ or more defect (number) | | | | X | | ○ | | X | | ○ | | X | | ○ |
| Count of 20 μ or more defect (number) | | | | ○ | | ○ | | ○ | | ○ | | X | | ○ |
| b value | | | | ◎ | | ○ | | ○ | | ◎ | | ◎ | | ○ |
| Bleedout | | | | ○ | | ○ | | ○ | | ○ | | ◎ | | ○ |

| | | Example 14 B-21 | Comparative Example 1 B-12 | Comparative Example 2 B-7 | Comparative Example 3 B-18 | Comparative Example 4 B-14 |
|---|---|---|---|---|---|---|
| CFC | Cumulative percentage elution from 50° C. to 98° C. | 63.0 | 71.0 | 93.1 | 49.2 | 85.0 |
| | Having component having Mw of 200,000 or more at 85° C. or more and less than 105° C. | ○ | X | ○ | ○ | ○ |
| Percentage of particle having particle size of 300 μm or more (wt %) | | 0.0 | 0.0 | 0.0 | 0.0 | 0.0 |
| Chlorine content (ppm) | | 14 | 19 | 10 | 8 | 18 |
| Lubricant content (ppm) | | 571 | 611 | 623 | 617 | 591 |
| CFC | Cumulative percentage elution at 50° C. or more and less than 94° C. (%) | 3.1 | 38.0 | 83.2 | 7.2 | 60.0 |
| | The number of peaks | 2 | 2 | 3 | 2 | 3 |
| Satisfaction of expression 1 | | ○ | ○ | ○ | ○ | ○ |
| Torque | Difference in temperature between peaks (° C.) | ○ 7 | ○ 18 | ○ 18 | ○ 17.5 | ○ 18 |

TABLE 2-continued

| | | | | | | | | | | |
|---|---|---|---|---|---|---|---|---|---|---|
| Puncture strength (N) | ○ | 3.5 | Δ | 3.4 | X | 2.8 | ◎ | 4 | X | 2.9 |
| Melting point (° C.) | ○ | 135 | ◎ | 129.8 | ◎ | 128.8 | X | 136.5 | ○ | 133.6 |
| MFR (g/10 min) | ◎ | 16 | ◎ | >20 | ◎ | >20 | X | 0.5 | ◎ | 10 |
| Slit processability | ○ | | X | | ○ | | ○ | | ○ | |
| Count of 50 μ or more defect (number) | ○ | | ○ | | ○ | | ○ | | ○ | |
| Count of 20 μ or more defect (number) | ○ | | ○ | | ○ | | ○ | | ○ | |
| b value | ○ | | ◎ | | ◎ | | ◎ | | ◎ | |
| Bleedout | ○ | | ○ | | ○ | | ◎ | | ○ | |

The present application is based on a Japanese patent application filed on Jul. 28, 2017 (Japanese Patent Application No. 2017-146829), the contents of which are incorporated herein by reference.

INDUSTRIAL APPLICABILITY

The polyethylene composition of the present invention can impart excellent strength and fuse performance to a processed separator and has favorable slit processability, and is therefore particularly useful as a starting material for separators.

The invention claimed is:

1. A polyethylene composition comprising:
the following features (A) and (B):
(A) a cumulative percentage elution from 50° C. to 98° C. is 50% by mass or more and less than 80% by mass in an elution temperature-cumulative eluate volume curve obtained by measuring eluate volumes every 1° C. by temperature rising elution fractionation (TREF) of cross-fractionation chromatography (CFC); and
(B) the polyethylene composition comprises at least one eluted component having a weight-average molecular weight ($M_w$) of 200,000 or more at a temperature of 85° C. or more and less than 105° C. among eluted components recovered every 1° C. by temperature rising elution fractionation (TREF) of cross-fractionation chromatography (CFC);
wherein a difference between a resin temperature at which a peak of the largest torque is detected and a resin temperature at which a peak of the second largest torque is detected is 23° C. or less in a torque curve obtained by kneading 24 g of liquid paraffin having an average molecular weight of 450 or more and less than 550 using Labo Plastomill (Toyo Seiki Seisaku-sho Ltd. product unit model 4C150, mixer model: R-60) under conditions of a set temperature of 114° C. and a rotational speed of 5 rpm for 10 minutes, then adding thereto 16 g of the polyethylene composition and 0.4 g of tetrakis[methylene(3,5-di-t-butyl-4-hydroxy-hydrocinnamate)]methane, and kneading the mixture at a rotational speed of 30 rpm for 3 minutes, followed by kneading under conditions of elevating the set temperature from 114° C. to 163° C. over 6 minutes.

2. The polyethylene composition according to claim 1, wherein
an on-sieve component is absent when the polyethylene composition is sifted using a sieve having an aperture size of 300 μm according to JIS Z 8815.

3. The polyethylene composition according to claim 1, wherein
a chlorine content is 50 ppm by mass or less.

4. The polyethylene composition according to claim 1, wherein
a content of an additive aimed at imparting fluidity is 5000 ppm by mass or less.

5. The polyethylene composition according to claim 1, wherein
a cumulative percentage elution from 50° C. to 94° C. is less than 40% by mass in the elution temperature-cumulative eluate volume curve obtained by measuring eluate volumes every 1° C. by temperature rising elution fractionation (TREF) of cross-fractionation chromatography (CFC).

6. The polyethylene composition according to claim 1, wherein
the cumulative percentage elution from 50° C. to 94° C. is 10% by mass or more in the elution temperature-cumulative eluate volume curve obtained by measuring eluate volumes every 1° C. by temperature rising elution fractionation (TREF) of cross-fractionation chromatography (CFC).

7. The polyethylene composition according to claim 1, wherein
the polyethylene composition comprises three or more peaks in an elution temperature-eluate volume curve obtained by measuring eluate volumes every 1° C. by temperature rising elution fractionation (TREF) of cross-fractionation chromatography (CFC).

8. The polyethylene composition according to claim 1, wherein
the polyethylene composition comprises a polyethylene powder, wherein
when the polyethylene powder is sifted using sieves having an aperture size of 53 μm, 75 μm, 106 μm, 150 μm, 212 μm, and 300 μm according to JIS Z 8815 and classified into each segment,
weight-average molecular weight $M_1$ of a coarsest-powder segment, weight-average molecular weight $M_2$ of a largest-percentage segment, and weight-average molecular weight $M_3$ of a finest-powder segment satisfy a relationship of the following expression 1:

$$0.8 M_1/M_2 \leq 1.2 \text{ and } 0.8 \leq M_3/M_2 \leq 1.2 \qquad \text{Expression 1.}$$

9. A polyethylene composition comprising:
the following features (A) and (B):
(A) a cumulative percentage elution from 50° C. to 98° C. is 50% by mass or more and less than 80% by mass in an elution temperature-cumulative eluate volume curve obtained by measuring eluate volumes every 1° C. by temperature rising elution fractionation (TREF) of cross-fractionation chromatography (CFC); and
(B) the polyethylene composition comprises at least one eluted component having a weight-average molecular weight ($M_w$) of 200,000 or more at a temperature of 85° C. or more and less than 105° C. among eluted components recovered every 1° C. by temperature rising elution fractionation (TREF) of cross-fractionation chromatography (CFC);

wherein the polyethylene composition comprises three or more peaks in an elution temperature-eluate volume curve obtained by measuring eluate volumes every 1° C. by temperature rising elution fractionation (TREF) of cross-fractionation chromatography (CFC).

* * * * *